(No Model.) 15 Sheets—Sheet 1.

F. J. LUDINGTON & E. T. POLLARD.
CIGARETTE MACHINE.

No. 454,593. Patented June 23, 1891.

Witnesses
Lillian D. Kelsey.
Chas. E. Peck.

Frank J. Ludington
and Edward T. Pollard
by Atty's Inventors
Earle Seymour (No Model.) 15 Sheets—Sheet 2.

F. J. LUDINGTON & E. T. POLLARD.
CIGARETTE MACHINE.

No. 454,593. Patented June 23, 1891.

Witnesses
Lillian D. Kelsey
Chas. E. Peck

Inventors
Frank J. Ludington
Edward T. Pollard
by Atty's
Earle Seymour (No Model.)  15 Sheets—Sheet 4.

F. J. LUDINGTON & E. T. POLLARD.
CIGARETTE MACHINE.

No. 454,593.  Patented June 23, 1891.

(No Model.) 15 Sheets—Sheet 6.

F. J. LUDINGTON & E. T. POLLARD.
CIGARETTE MACHINE.

No. 454,593. Patented June 23, 1891.

(No Model.) 15 Sheets—Sheet 7.
F. J. LUDINGTON & E. T. POLLARD.
CIGARETTE MACHINE.
No. 454,593. Patented June 23, 1891.
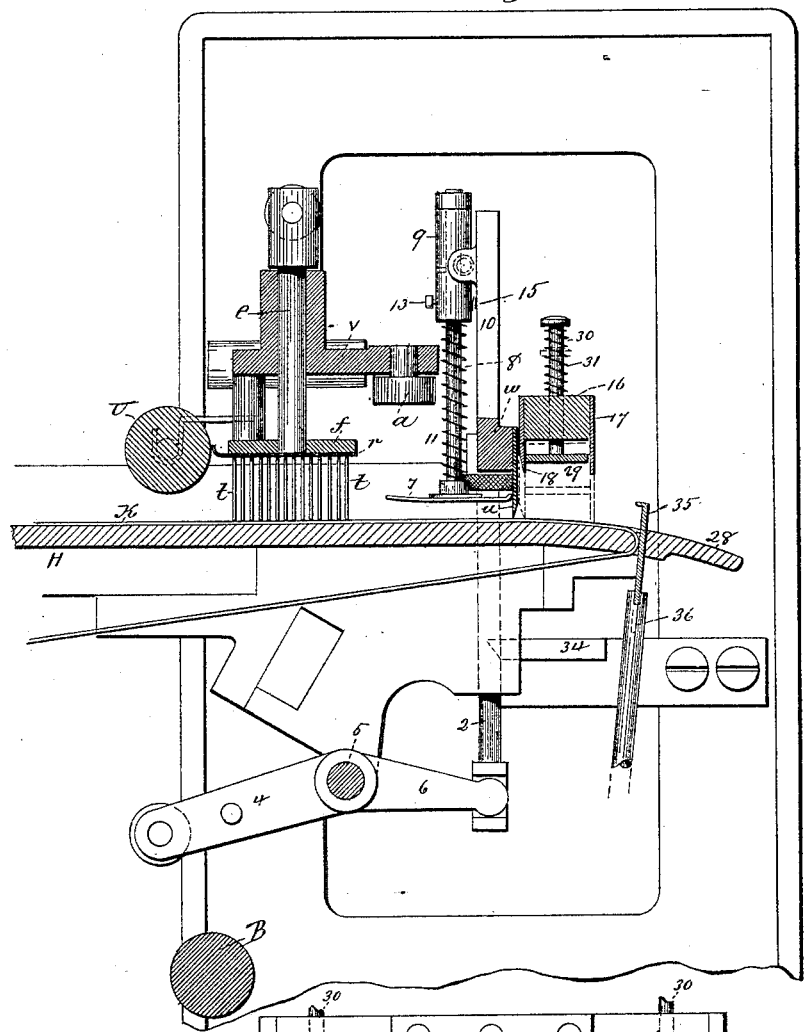
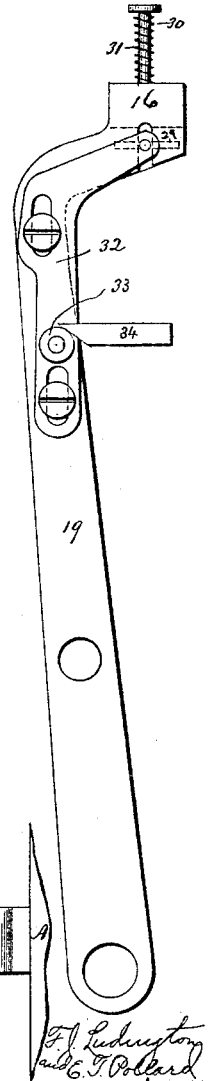
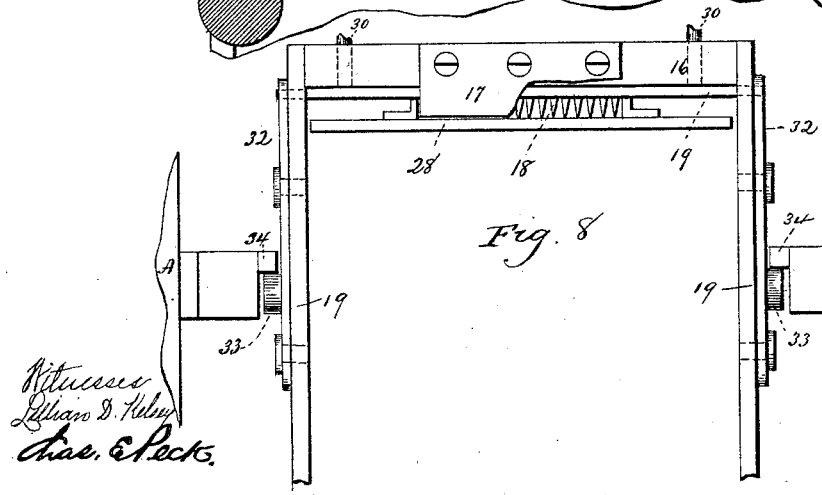

(No Model.) 15 Sheets—Sheet 8.

F. J. LUDINGTON & E. T. POLLARD.
CIGARETTE MACHINE.

No. 454,593. Patented June 23, 1891.

(No Model.) 15 Sheets—Sheet 9.

F. J. LUDINGTON & E. T. POLLARD.
CIGARETTE MACHINE.

No. 454,593. Patented June 23, 1891.

Witnesses
Lillian D. Kelsey
Trav. E. Peck

Frank J. Ludington
and Edward T. Pollard
Inventors
by attys
Earle Seymour (No Model.) 15 Sheets—Sheet 10.
F. J. LUDINGTON & E. T. POLLARD.
CIGARETTE MACHINE.
No. 454,593. Patented June 23, 1891.
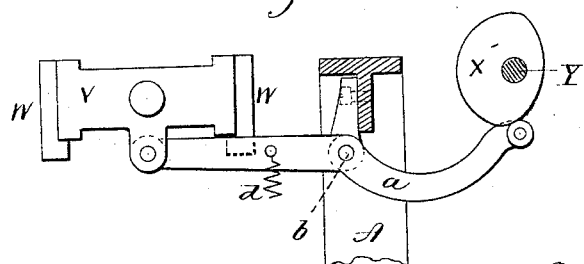
Fig. 13
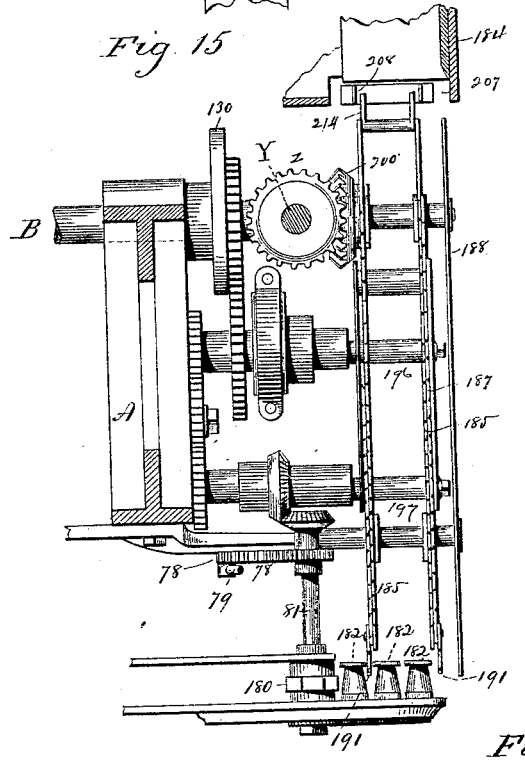
Fig. 15
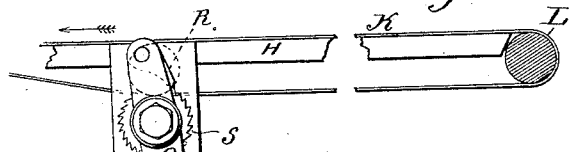
Fig. 14
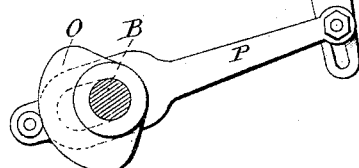

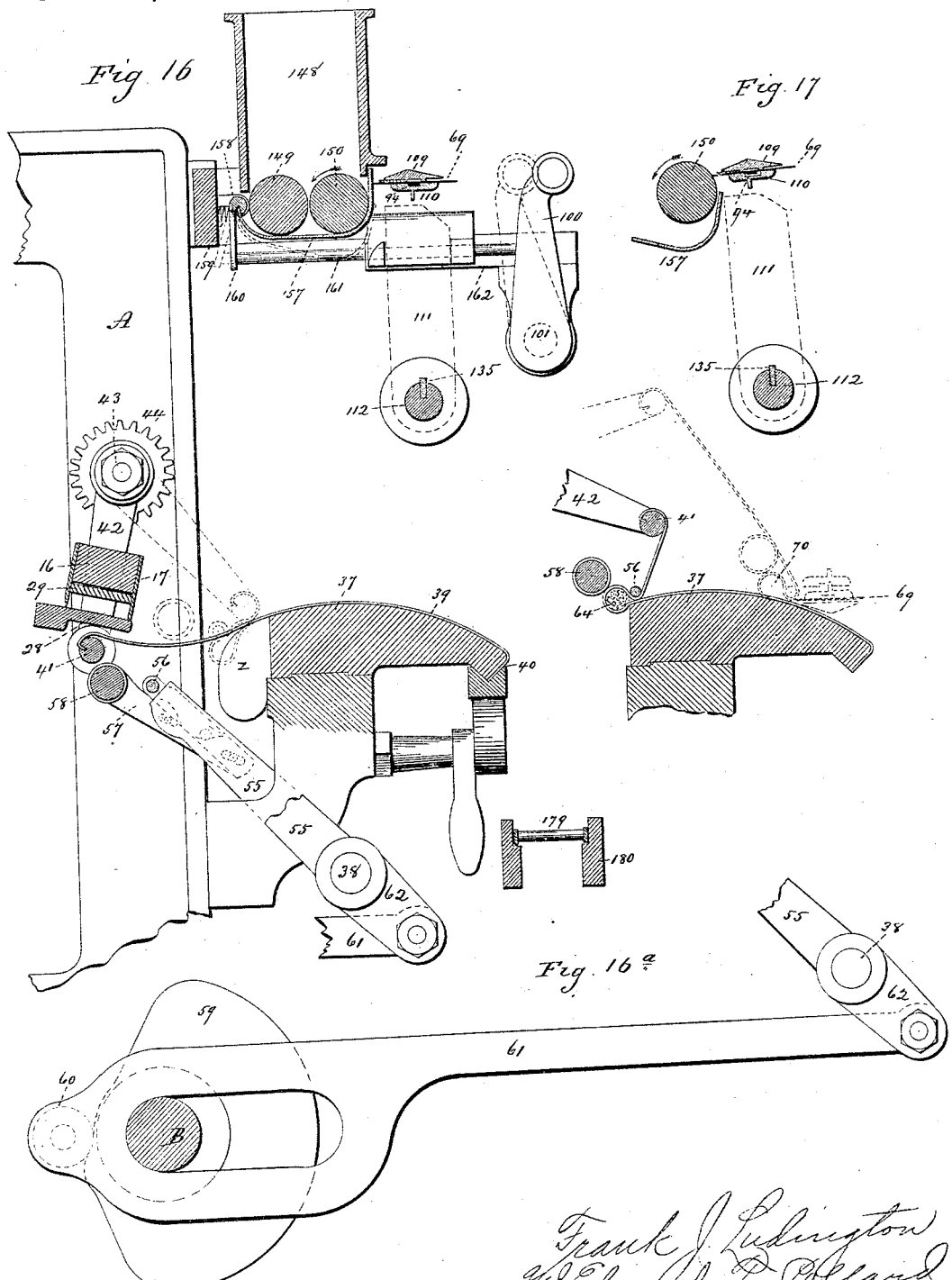

(No Model.) 15 Sheets—Sheet 12.
F. J. LUDINGTON & E. T. POLLARD.
CIGARETTE MACHINE.
No. 454,593. Patented June 23, 1891.
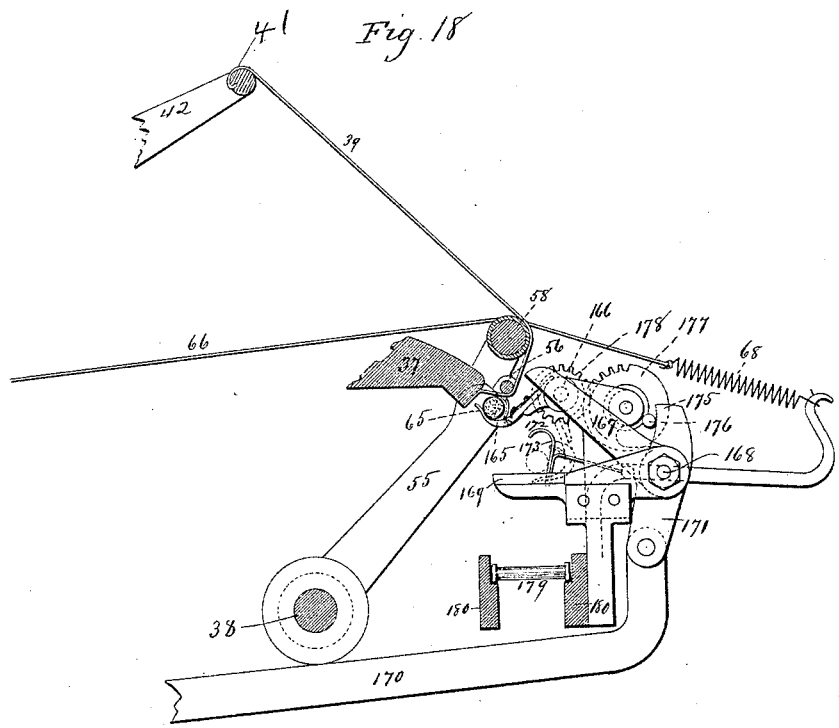
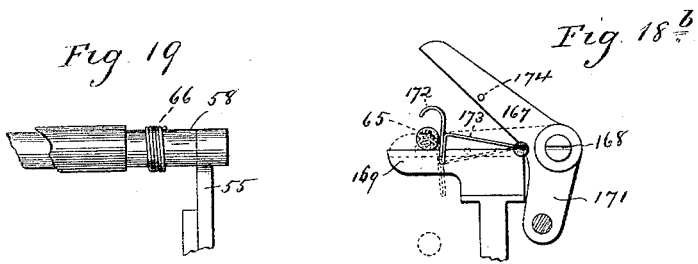

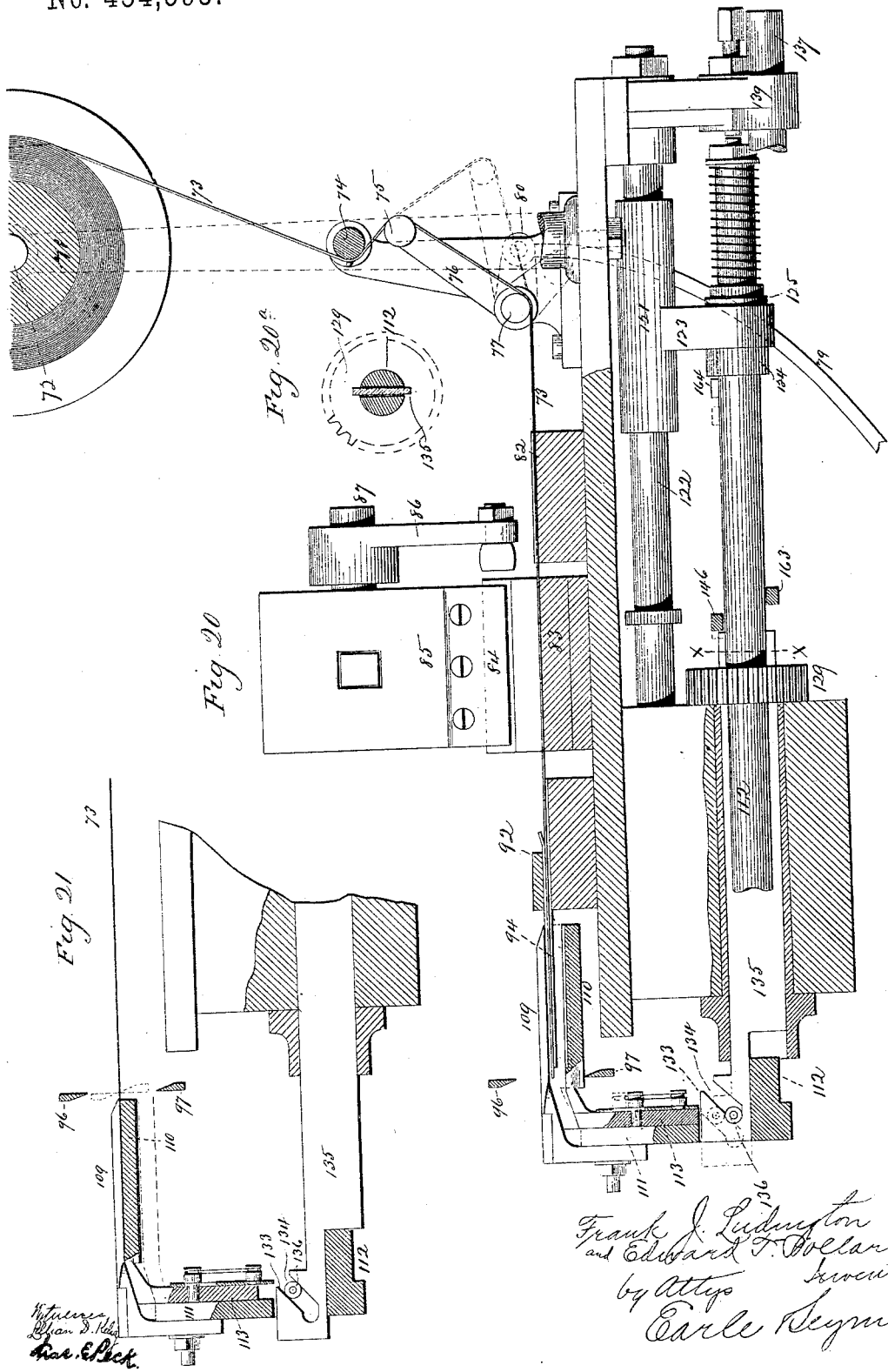

(No Model.) 15 Sheets—Sheet 14.
F. J. LUDINGTON & E. T. POLLARD.
CIGARETTE MACHINE.
No. 454,593. Patented June 23, 1891.
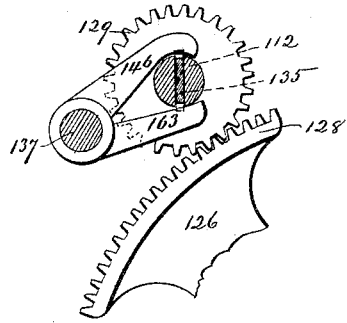
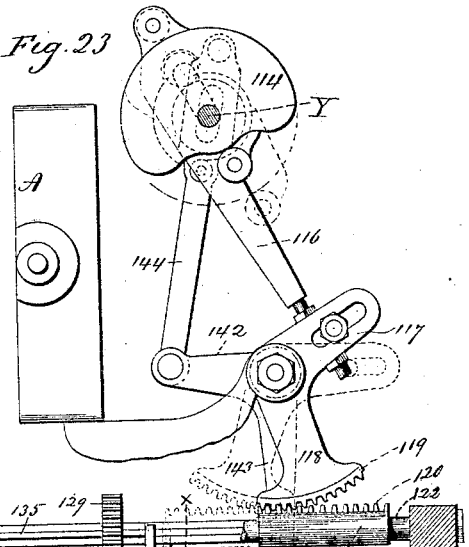
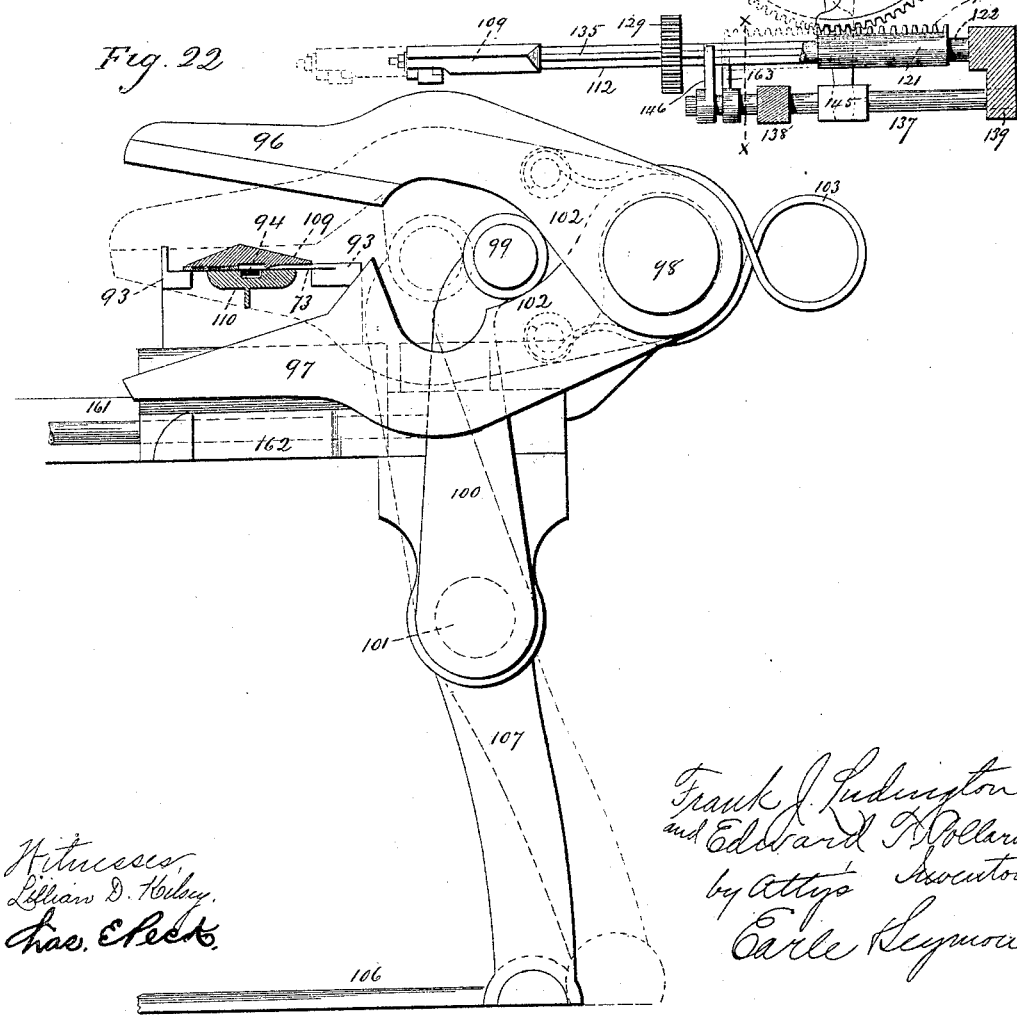

(No Model.) 15 Sheets—Sheet 15.

F. J. LUDINGTON & E. T. POLLARD.
CIGARETTE MACHINE.

No. 454,593. Patented June 23, 1891.

Witnesses
Chas B. Shumway
Fred W. Peck

F. J. Ludington
and E. T. Pollard
Inventors
by Attys.
Earle Seymour

UNITED STATES PATENT OFFICE.

FRANK J. LUDINGTON, OF WATERBURY, CONNECTICUT, AND EDWARD T. POLLARD, OF RICHMOND, VIRGINIA, ASSIGNORS TO THE LUDINGTON COMPANY, OF NEW HAVEN, CONNECTICUT.

CIGARETTE-MACHINE.

SPECIFICATION forming part of Letters Patent No. 454,593, dated June 23, 1891.

Application filed July 16, 1890. Serial No. 358,991. (No model.)

*To all whom it may concern:*

Be it known that we, FRANK J. LUDINGTON, of Waterbury, county of New Haven, State of Connecticut, and EDWARD T. POLLARD, of Richmond, in the county of Henrico and State of Virginia, have invented a new Improvement in Machines for Making Cigarettes; and we do hereby declare the following, when taken in connection with accompanying drawings and the letters and figures of reference marked thereon, to be a full, clear, and exact description of the same, and which said drawings constitute part of this specification, and represent, in—

Figure 1:
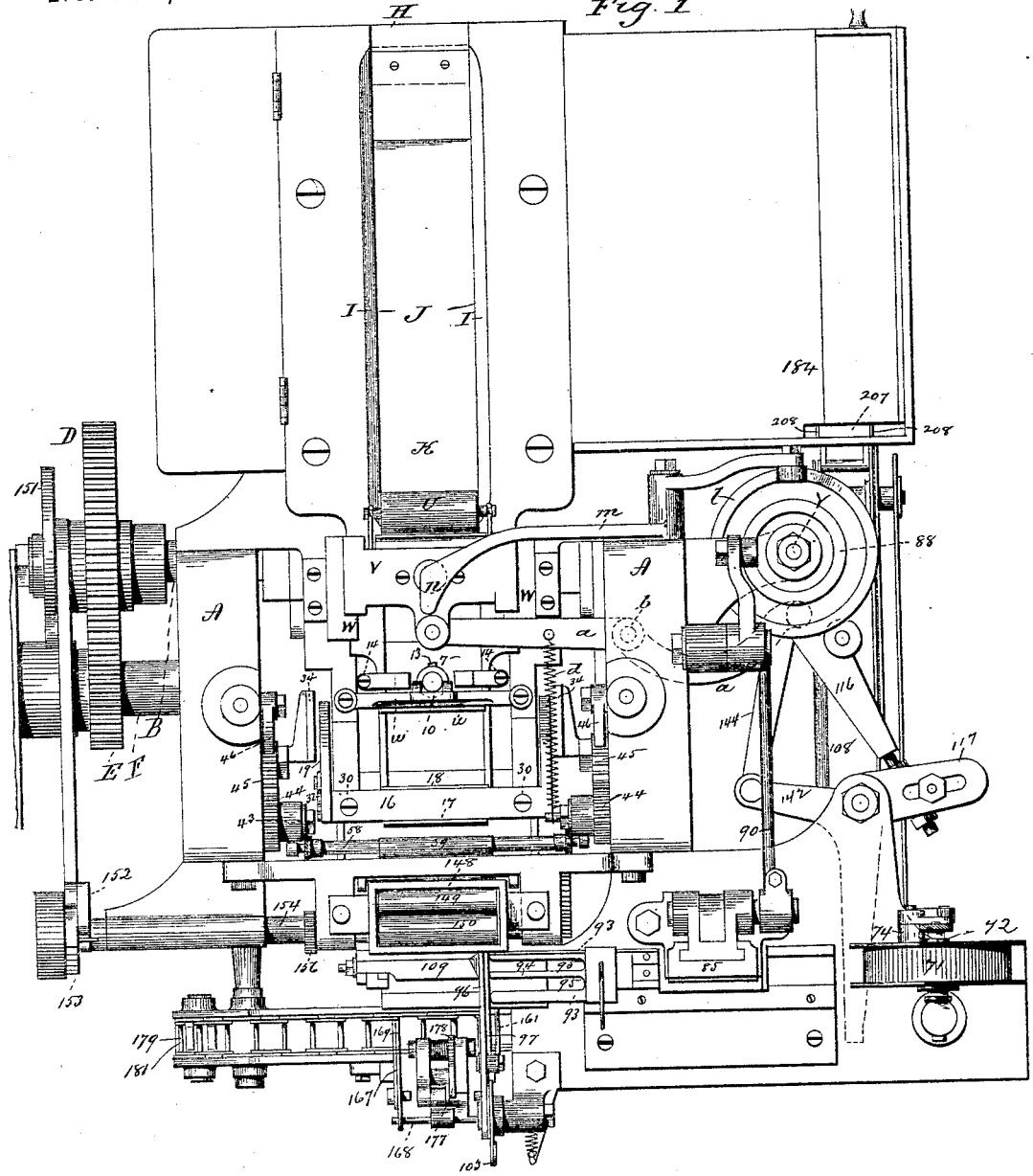
Figure 2:
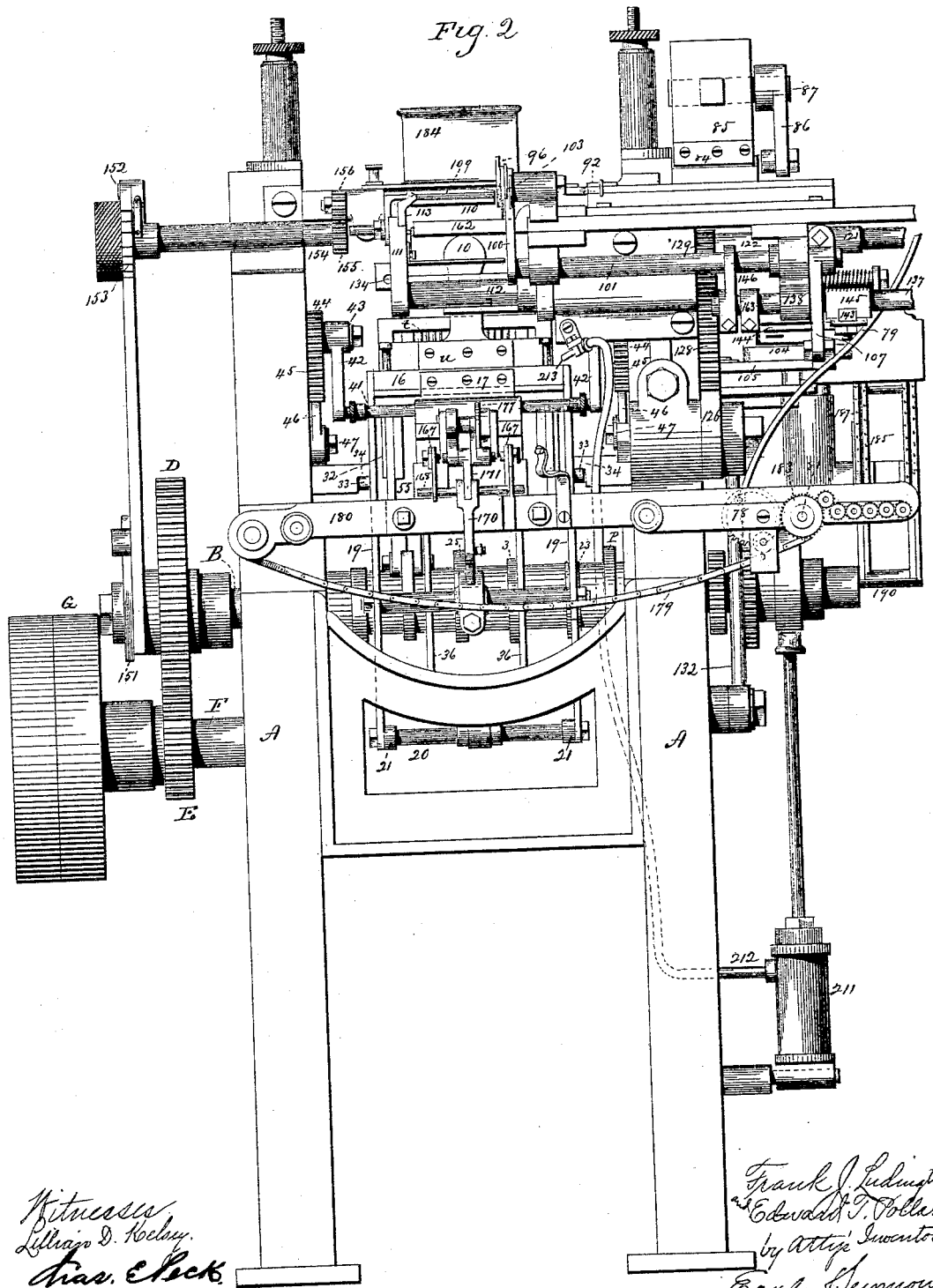
Figure 3:
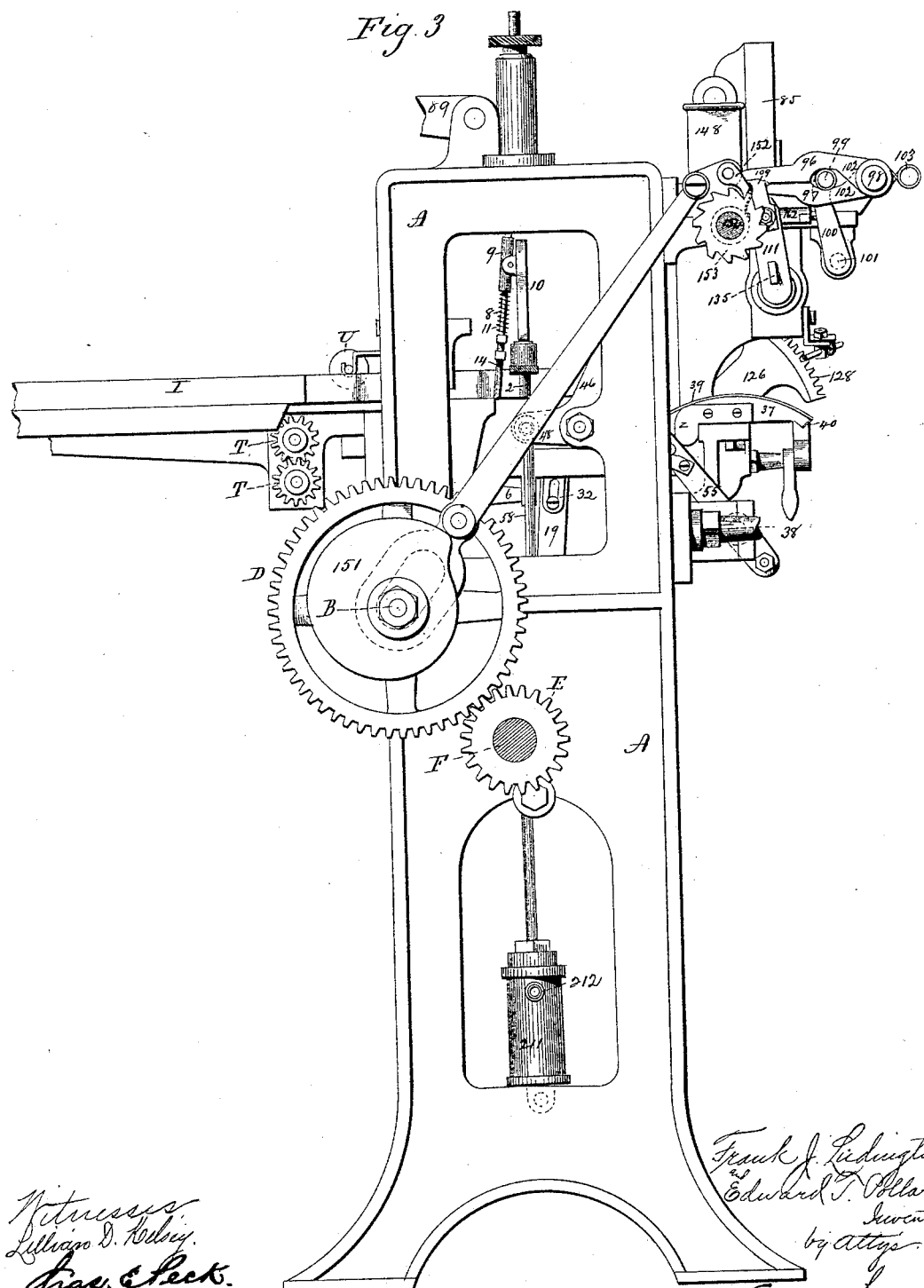
Figure 4:
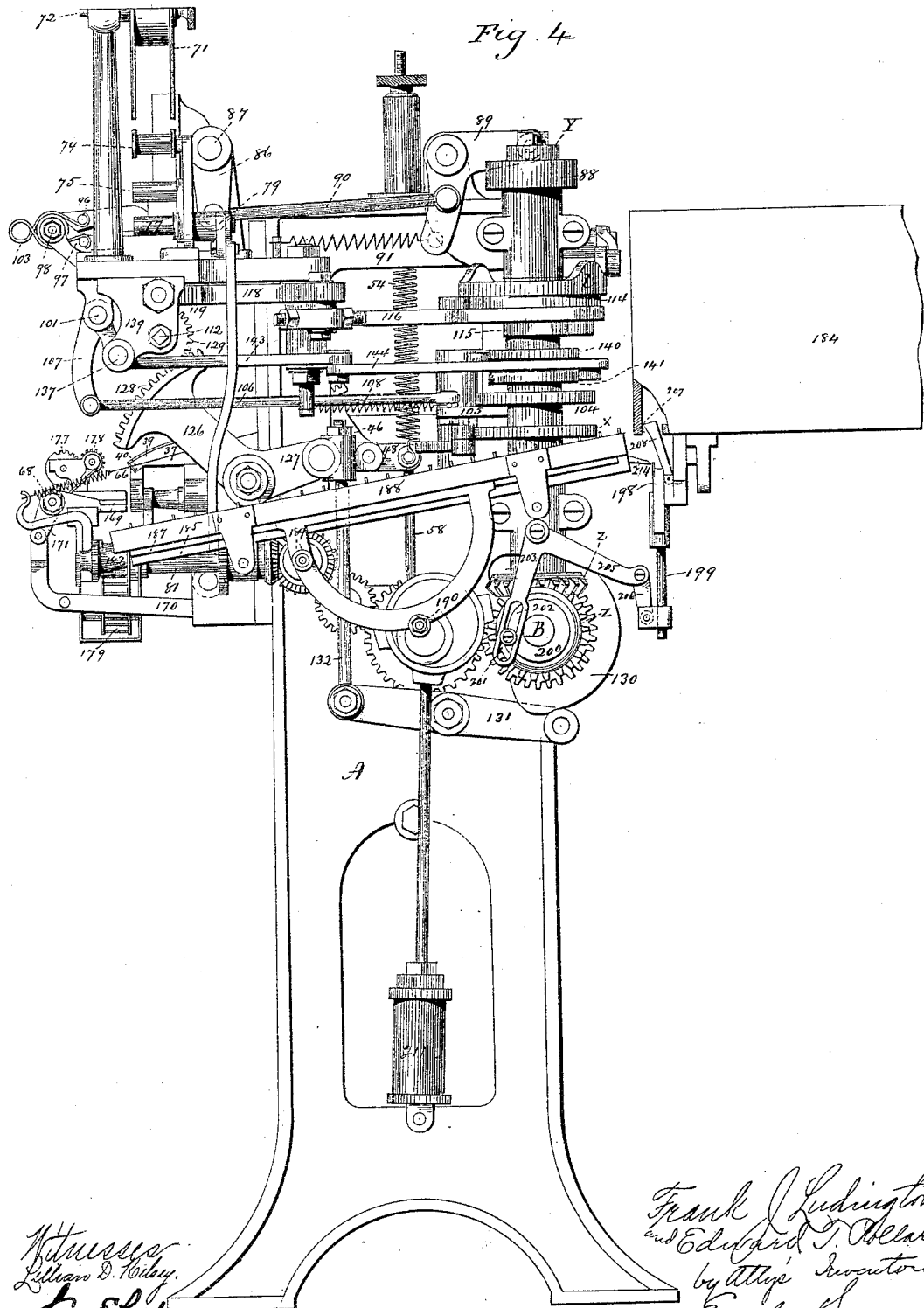
Figure 5:
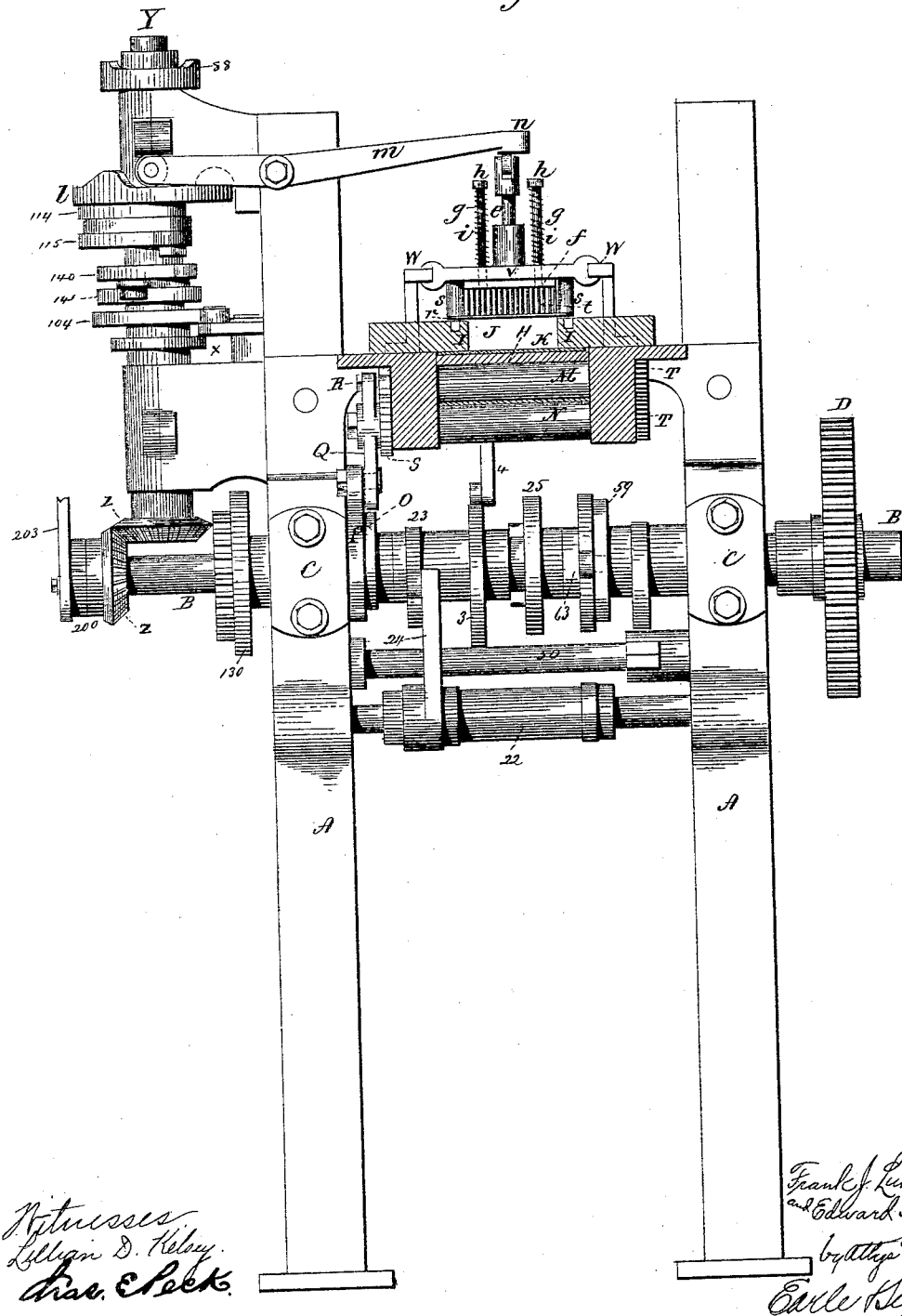
Figure 6:
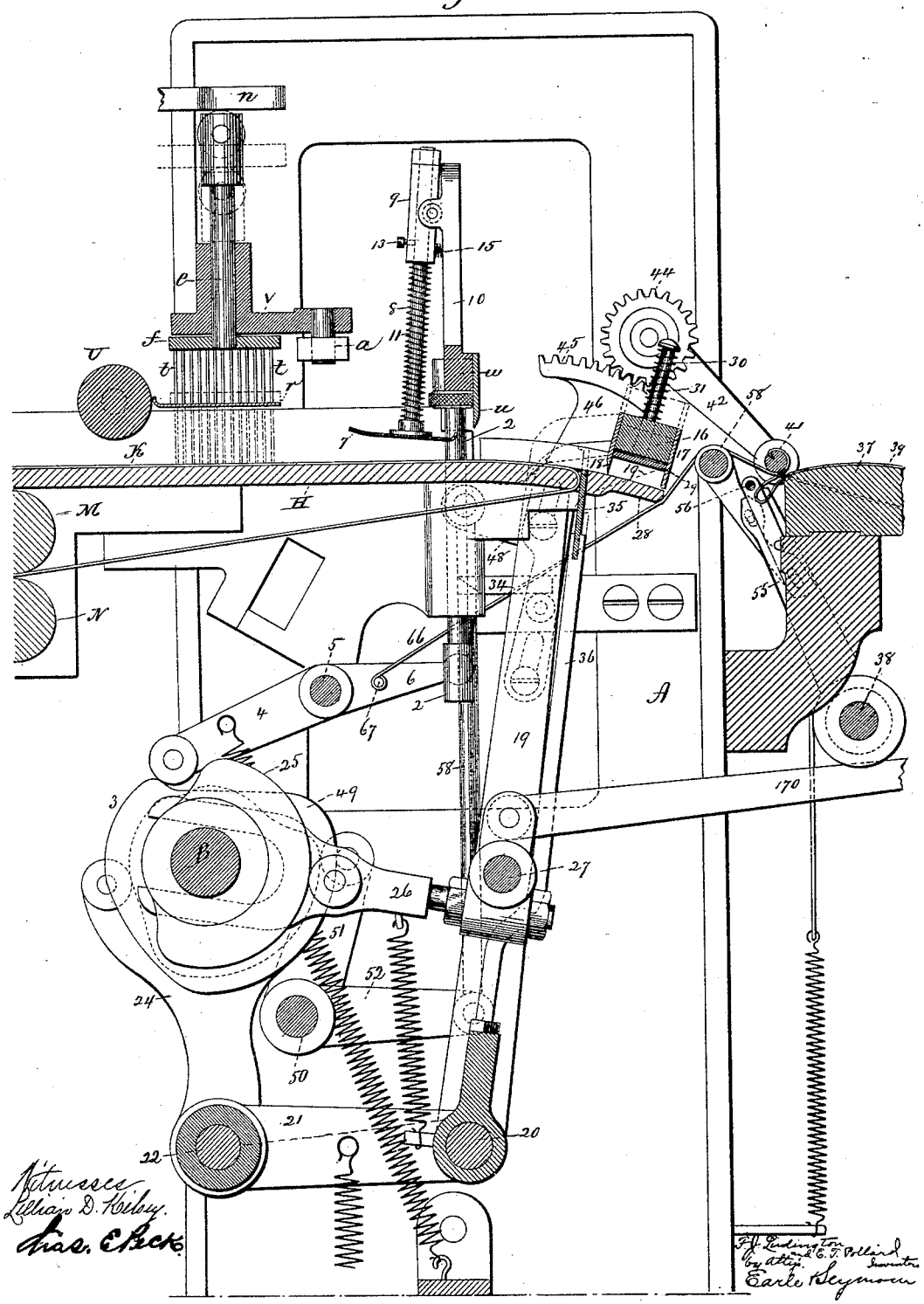
Figure 10:
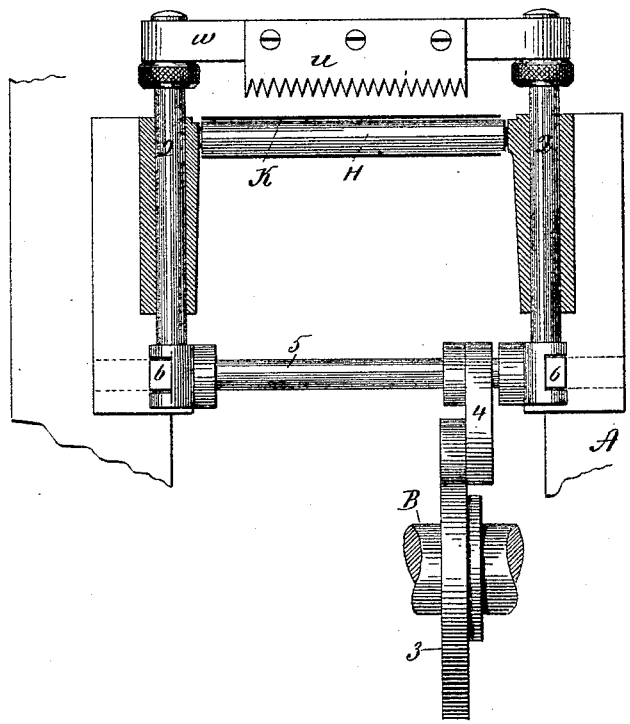
Figure 18A:
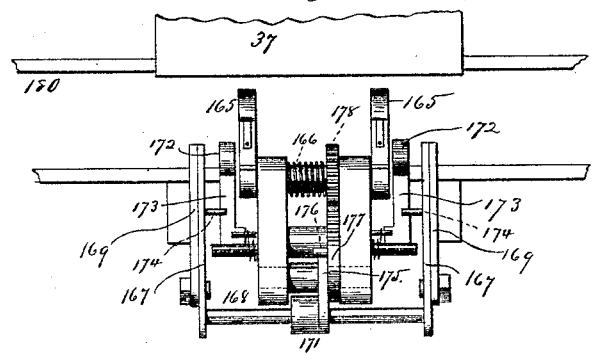
Figure 11:
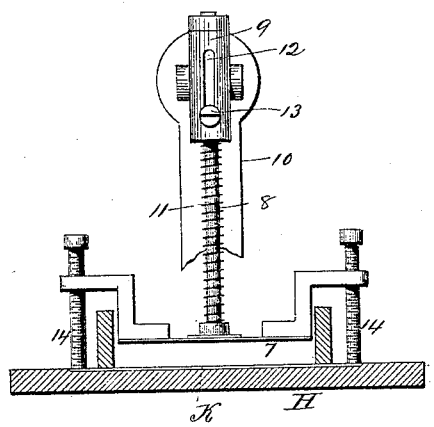
Figure 12:
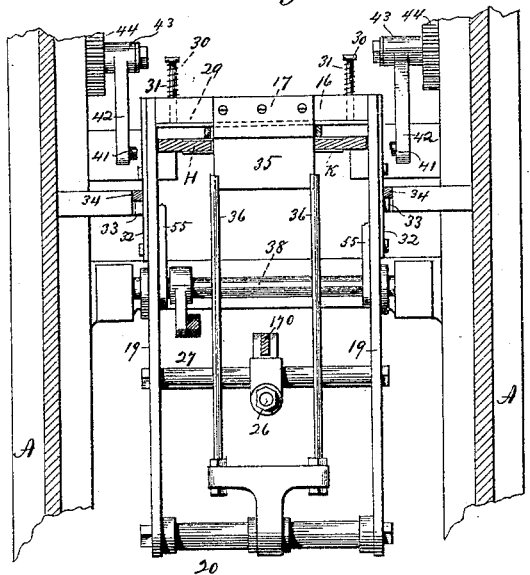
Figures 25, 26:
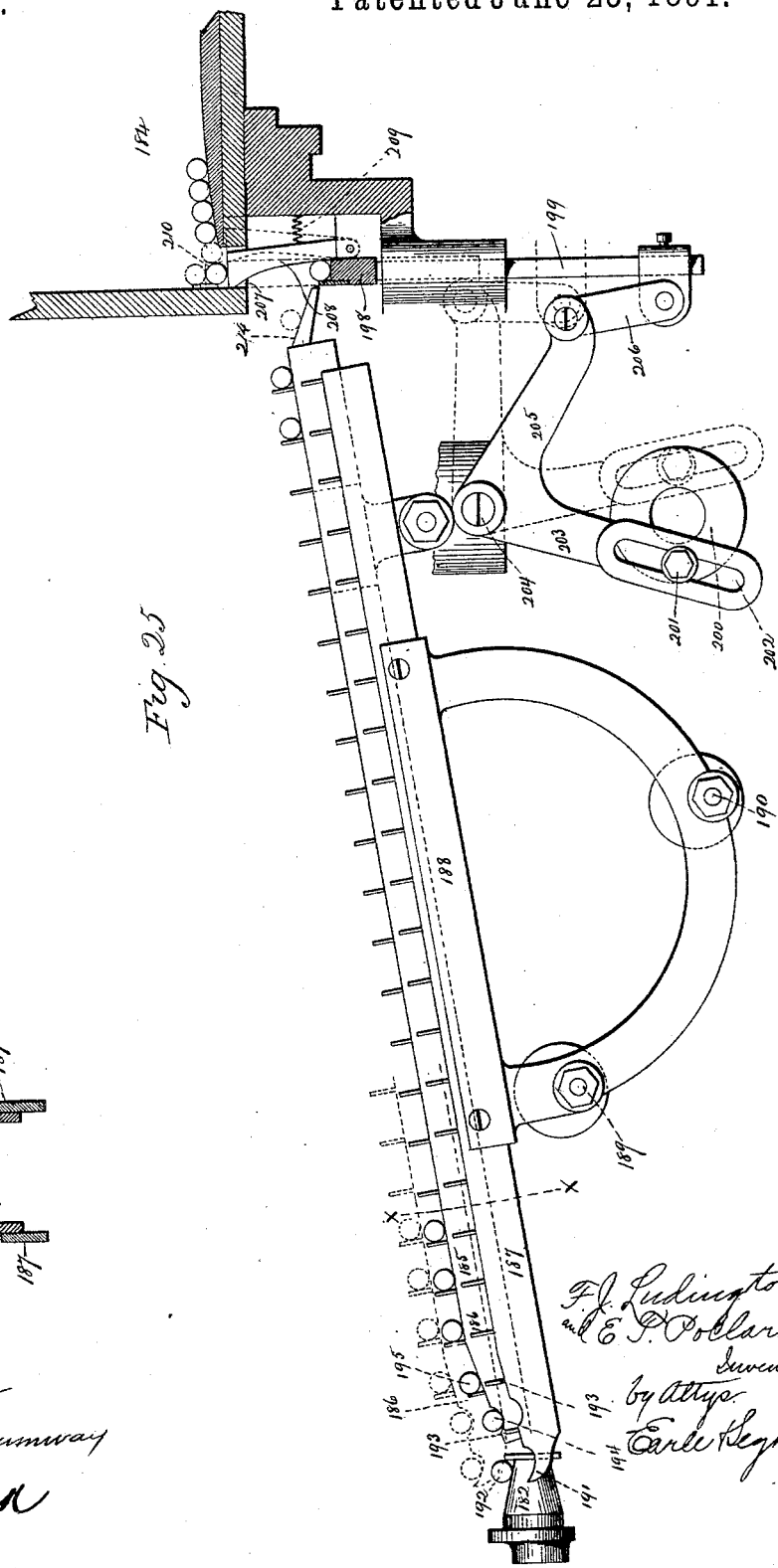

Figure 1, a top or plan view of the machine complete; Fig. 2, a front view of the same; Fig. 3, a side view looking from the left of Fig. 1, the pulleys detached; Fig. 4, a side view looking from the right; Fig. 5, a rear view showing transverse section through the channel and apron; Fig. 6, a longitudinal central section enlarged, a portion of the channel at the rear broken away, as also the front part of the machine, showing only a portion of the rolling-table; Fig. 7, the same as Fig. 6, to illustrate the operation of the deliverer, this and the following figures being also enlarged; Fig. 8, a front view of a portion of the deliverer, part of the guard broken away; Fig. 9, a side view of the deliverer detached to illustrate the operation of the follower of the deliverer; Fig. 10, a transverse section of a portion of the machine to illustrate the construction and operation of the comb $u$; Fig. 11, a detached transverse section showing rear view of the presser-foot; Fig. 12, a detached section showing front view of the deliverer and of the scraper 35; Fig. 13, a detached plan view illustrating the device for imparting reciprocating movement to the distributer-carriage; Fig. 14, a detached view illustrating the means for imparting intermittent movement to the endless tobacco-carrying apron; Fig. 15, a detached plan view of the mechanism for delivering the cigarette to the receiver; Fig. 16, a detached vertical section of the rolling-table, illustrating the delivery of tobacco thereto preparatory to the rolling operation; Fig. 16$^a$, a detached view illustrating the means for imparting the swinging movement to the guard-bar 56 and the roller 58; Fig. 17, a like section to Fig. 16, illustrating the rolling operation and the delivery of the wrapper to the rolling-apron; Fig. 18, a detached sectional view of the forward end of the rolling-table, showing the apron as discharging the cigarette, with a side view of trimming devices as just receiving a cigarette from the apron; Fig. 18$^a$, a detached top or plan view of the forward end of the rolling-table and of the trimming devices; Fig. 18$^b$, a side view of one pair of trimming-cutters, illustrating the operation of the clearer 172; Fig. 19, a detached view of part of the roller 58, illustrating the arrangement of the cord whereby revolution is imparted to the roller; Fig. 20, a detached longitudinal section through the paper feeding and deliverer devices, showing the fingers as about to take paper for the feed; Fig. 20$^a$, a transverse section through the shaft 112 on line $x\,x$ of Fig. 20; Fig. 21, a portion of the same as Fig. 20, showing the fingers as having fed the paper and as the cutters are operating to sever the paper; Fig. 22, a detached side view of the paper-cutters, showing the paper-fingers in transverse section and end view of the paper-table; Fig. 23, a detached plan view illustrating the mechanism for operating the said fingers; Fig. 24, a detached transverse section through the shafts 137 and 112 on line $x\,x$ of Fig. 23; Fig. 25, a side view of the carrying devices for and the delivery of the cigarettes to the receiver, the receiver being shown in vertical section; Fig. 26, a transverse section through the carrying-bars on line $x\,x$ of Fig. 25.

This invention relates to an improvement in machines for making cigarettes, and in which the tobacco is supplied in mass, the requisite quantity taken therefrom, a wrapper presented, the tobacco rolled and inclosed by the wrapper, the edge of the wrapper pasted, and the cigarette delivered complete from the machine, the operations all being automatic; and the invention is an improvement upon the machine for which Letters Patent of the United States No. 400,780 were granted to Frank J. Ludington, one of the inventors herein, April 2, 1889, and embodies many of the features shown and described in Letters Patent to said Ludington, No. 439,963, dated November 4, 1890; and the invention consists in the construction and combination of parts, as hereinafter described, and more particularly recited in the claims.

A represents the frame of the machine; B, the driving-shaft, supported in bearings C in the frame. This shaft carries a gear-wheel D, into which a pinion E on a stud F works, the said pinion being in connection with a driving-pulley G, through which power is communicated to the pinion E and thence to the driving-shaft through the gear D; but for this means of communicating power any of the well-known substitutes may be employed.

H represents the table upon which the tobacco is placed. Upon this table longitudinal side walls I are arranged distant from each other according to the width of the mass of tobacco required to be furnished to the machine—that is, somewhat greater than the length of the cigarette to be produced. These walls form a longitudinal channel J at the rear of the machine. (See Figs. 1 and 5.)

Over the table H is an endless apron K, which passes around a drum L at the extreme rear of the machine. (See Fig. 14; also seen in broken lines, Fig. 1.) The apron extends forward over and around the extreme forward end of the table H, as seen in Fig. 6, and returning beneath the table, passes between drums M and N, (see Figs. 6 and 14,) and so that the tobacco in the channel lies upon this apron and will be advanced as the apron is advanced. The advance or feed of the apron is required to be intermittent and of an extent to deliver the requisite quantity of tobacco. To produce this movement of the apron, an intermittent rotary or advance movement is imparted to the drums M N by means of a cam O on the driving-shaft operating through a connecting-rod P upon a lever Q, hung upon the axis of the drum N. (See Figs. 5 and 14.) This lever Q carries a pawl R, which works into a corresponding toothed ratchet S, made fast to the axis of the drum N, and so that as a vibratory movement is imparted to the lever a corresponding advance movement will be communicated to the drum N, and the two drums being geared together by pinions T T and the lower run of the band being grasped between the two drums the intermittent rotary movement given to the drums will impart a corresponding advance movement to the band, and so that the tobacco lying in the channel on the band will be correspondingly moved.

U represents a pressure-roll above the apron K, and beneath which the tobacco will run, this roll being designed to give a slight compression to the mass of tobacco as it is fed along.

It is important in a perfect cigarette that there shall be an equal distribution of tobacco throughout—that is to say, that the tobacco shall be so equally distributed that it will be substantially no more dense at one part of the cigarette than another. It is very difficult to so distribute the tobacco by hand in the channel. To insure such equal distribution, we introduce a mechanical distributer. This distributer consists of a carriage V, arranged transversely over the apron and forward of the pressure-roll U upon parallel guides W, and to which a slight reciprocating movement is imparted by means of a cam X on a vertical shaft Y. (See Figs. 1 and 13.) The vertical shaft Y is supported in suitable bearings and is in connection with the driving-shaft B by means of bevel-pinions Z Z. (See Figs. 4 and 5.) Between the cam X and the carriage V a lever $a$ is hung upon an axis $b$, one arm working against the cam and the other in connection with the carriage, as seen in Fig. 13, and so that the said cam will impart to the said carriage a rear movement, and the spring will impart a corresponding forward movement when the cam permits it so to do.

Vertically through the carriage V is a spindle $e$, arranged to work up and down therein, and carries upon its lower end a plate $f$. The plate is also provided with two vertical spindles $g\ g$, extending up through the carriage V. (See Fig. 5.) The said spindles are provided with heads $h$, between which and the carriage springs $i$ are arranged, the tendency of the said springs being to hold the plate $f$ in its up position, and so that an up-and-down movement may be imparted to said plate $f$. The downward movement is given to the plate $f$ by means of a cam $l$ on the vertical shaft Y (see Figs. 1 and 5,) through a lever $m$, arranged to bear upon the upper end of the spindle $e$, and so that the cam will impart a downward movement to the said plate $f$, as from the position seen in Fig. 6 to that seen in Fig. 7, while the springs $g$ will return the plate when the cam permits them so to do. The bearing end $n$ of the lever $m$ is of an extent sufficient to permit the spindle beneath it to travel with the carriage without escaping from the operation of the lever $m$. Beneath the plate $f$ is a plate $r$, attached to the carriage V by studs $s$, (see Fig. 5,) the said plate $r$ being parallel with the plate $f$ and standing over the channel, but so as to move backward and forward with the carriage and substantially as a part of the carriage, the plate $f$ working up and down between the carriage and the said plate $r$. The plate $f$ is provided upon its under face with numerous wire pins $t$. (See Figs. 5 and 6.) These pins are small in diameter and are distributed over the under surface of the plate $f$, projecting downward therefrom, and extend through corresponding perforations in the plate $r$, and so that the pins work closely through the perforations in the said plate $r$, the length of the pins being substantially the depth of the channel.

As the tobacco is fed by the movement of the apron, as before described, and passes under the roller U, it passes directly beneath the plate $r$, and as it is advancing the plate $f$ descends, and forces the pins down into the channel and through the tobacco, as represented in broken lines, Fig. 6, and as also seen in Fig. 7. The carriage carrying the pins and the plate $r$ will be permitted to advance under the action of the spring so fast as the mass of tobacco advances, and after the feed or advance movement of the tobacco has taken place the plate $f$ rises to take the pins out of the mass of tobacco, when the carriage, with the plates $f$ and $r$, will return for the next feed of tobacco. The extent of these pins from front to rear is considerably greater than the advance feed of tobacco. Consequently they will pierce the some mass of tobacco several times as it is advanced, and because of their distribution will enter the tobacco at different points at each descent. The operation of these pins upon the mass of tobacco through which they pass is to force the tobacco from where it is the most solid or dense to other points where it is less dense until the several operations have produced an equal distribution of the tobacco. The pins in working up and down through the tobacco will be almost unavoidably gummed by the tobacco to a greater or less extent, and as they work closely through the perforations in the plate $r$ as the pins rise said plate $r$ serves as a scraper for the pins to strip from them whatever gum or substance from the tobacco may have adhered thereto. In cases where there is little liability of gumming the pins the plate $r$ may be omitted.

To sever the requisite quantity of tobacco from the mass for a cigarette, a toothed bar or comb $u$ is arranged above and transversely across the apron. The comb is attached to a transverse bar $w$, arranged transversely over the apron and carried by vertically-guided rods, one on each side of the machine, as seen in Fig. 10, and to which a vertically-reciprocating movement is imparted from a cam 3 on the driving-shaft B, the cam working upon an arm 4, (see Fig. 6,) attached to a rock-shaft 5, which rock-shaft carries a pair of arms 6, extending into connection with the respective rods 2, as clearly seen in Figs. 6 and 9, the shape of the cam being such, as seen in Fig. 6, that at the proper time the comb will be brought down upon and through the tobacco, as seen in Fig. 7, the teeth of the comb being adapted to readily pass through the tobacco. At the point where the portion of the tobacco for a cigarette is to be separated from the mass it is desirable that it should be pressed into as solid a condition as it conveniently can be. To do this a presser-foot 7 is arranged directly in rear of the comb. This presser-foot is carried upon the lower end of a spindle 8, (see Figs. 6, 7, and 11,) the spindle passing through a tubular guide 9, hinged to an upwardly-projecting arm 10 from the bar $w$, which carries the comb $u$, the axis of the hinge being parallel with the plane of the comb, and so that the presser-foot may receive a backward-and-forward swinging movement, as from the position seen in Fig. 6 to that seen in Fig. 7 and return, this swinging movement being independent of the comb. The spring 11 is arranged upon the spindle 8, the tendency of which is to force the presser-foot 7 downward; but the downward movement of the presser-foot is limited by means of a vertical slot 12 in the tubular guide 9, (see Fig. 11,) a stud 13 extending from the spindle through the said slot. This slot connection between the spindle and the guide 9 permits the guide to be moved up and down with the comb, and so that the comb may receive a limited vertical movement without imparting corresponding movement to the presser-foot. The presser-foot is provided at each end with a set-screw 14, (see Fig. 11,) which are adapted to strike the apron below and arrest the further descent of the presser-foot. A spring is arranged, the tendency of which is to return the presser-foot into the rear position, as seen in Fig. 6. This spring is represented at 15, Fig. 6, and so that normally the presser-foot will stand in the rear position shown in that figure; but the spring 15 will yield for the forward movement of the presser-foot to the position seen in Fig. 7. As the tobacco is advanced the comb $u$ descends under the action of the cam 3, as before described, and during the first part of its descent it brings the presser-foot directly upon the mass of tobacco, and with a pressure equal to the pressure of the spring 11. The tobacco, traveling under the influence of the apron K, engages the presser-foot and causes it to advance with the tobacco to the position seen in Fig. 7. This movement of the presser-foot occurs before the comb reaches the tobacco, and when this position is attained the feed of the tobacco ceases, and the mass is held between the apron and the presser-foot. The comb, continuing its descent, passes through the tobacco until it substantially strikes the apron, as seen in Fig. 7, the comb there holding the tobacco with the quantity which is required for a cigarette lying in front of it. To separate the tobacco thus projecting forward from the comb $u$ and take it to the rolling and wrapping mechanism hereinafter described, a deliverer is provided, which consists of a transverse bar 16. (See Figs. 7 and 8.) This bar carries upon its front edge a guard 17 and upon its rear edge a comb 18, the comb corresponding to the comb $u$, and, like that comb, presents a series of sharp teeth, as seen in Fig. 8, which are adapted to enter the mass of tobacco close up to the comb $u$ and be forced down through the tobacco, as seen in broken lines, Fig. 7. Then the bar 16, receiving an advance movement, will cause the comb to separate the tobacco, which then stands between the comb and the guard 17, from the mass, the mass being held back by the comb $u$ and the presser-foot 7. The distance between the comb 18 and the guard 17 is at least the width required for the tobacco which the comb is to separate from the mass and as required for the formation of a cigarette. The deliverer first stands above the tobacco, so as to bring the comb 18 close up to the comb $u$, as seen in Fig. 7, and then a downward movement of the deliverer takes the guard 17 forward of the projecting portion of the tobacco, and the comb 18 passes through the tobacco close up against the comb $u$. The deliverer is then advanced, as seen in Fig. 6, the comb separating the tobacco within the deliverer from the mass held back, as before described. To impart such combined up-and-down and backward-and-forward movements to the deliverer, the bar 16 is attached at each end to vertical rods 19, which rods extend down and are connected by a shaft 20. (See Figs. 6 and 2.) The shaft 20 is carried by arms 21, extending from a rock-shaft 22 below the driving-shaft, (see Fig. 6,) and to this rock-shaft 22 an oscillating movement is imparted by a cam 23 on the driving-shaft through a forked lever 24, made fast to the shaft 22, as seen in Figs. 5 and 6, and so that the oscillating movement of the shaft will impart a corresponding up-and-down movement to the rods 19 and the bar 16, connected thereto, and as indicated in broken lines, Fig. 7. The forward-and-back movement is imparted to the bar 16 by means of a cam 25 on the driving-shaft and corresponding connecting-rod 26, hung to a shaft 27, which extends between the two bars 19, as seen in Figs. 6 and 12. This cam imparts the forward or advance movement to the deliverer, the return movement being made by means of a spring, (not shown,) and so that in the advance movement of the deliverer it passes from the position seen in broken lines, Fig. 7, to that seen in Fig. 6, moving on the arc of a circle of which the rock-shaft 20 is the center, and so that the edges of the guard and comb may run in close contact with the table throughout its movement. The table is correspondingly curved from the comb $u$ to its forward end, as seen in Figs. 6 and 7, and forward of the forward end of the table is an extension 28, forming a continuation of the table and upon the same curve; but the endless apron passes down between the forward end of the table H and the rear edge of this extension, as seen in Figs. 7 and 8. As the deliverer is brought to the extreme forward position, as seen in Fig. 6, the cam 3 comes into operation and raises the deliverer into the position represented in broken lines in said Fig. 6, in which raised position the deliverer is returned to its rear position, as seen in Fig. 7. In the meantime the comb $u$ has risen for the advance of the tobacco, and as the deliverer returns to its rear position the comb $u$ is again brought down to engage the tobacco, and then the deliverer in its turn comes down and takes a second mass of tobacco and advances as before, and as it advances the guard will strike the first tobacco delivered and move it forward, so that the tobacco will escape from the table, and then the second quantity is left in the place of the first.

In order that the tobacco may be discharged from the deliverer as it rises from the position seen in Fig. 6 to that seen in broken lines, same figure, and so that the tobacco will be with certainty left upon the table as the deliverer rises, a follower 29 is arranged beneath the bar and between the guide and comb. The follower is supported upon two vertical guide-rods 30, which extend up through the bar 16, and the upper ends of the said rods are headed, and springs 31 are applied between the heads of the rods and the top of the bar 16, as seen in Figs. 7 and 12, the tendency of these springs being to hold the follower in the up position between the guard and comb, and, as seen in Fig. 6, the bar 16 being so far above the lower edges of the comb and guard as to permit the presence of the follower and also leave space below for the tobacco and follower, as before described. The follower is independent of the bar so far as vertical movement is concerned and is attached at its ends to levers 32, one at each side of the rods 19. (See Figs. 8 and 9.) The said levers are hung to the rods 19 by slotted connections, as represented in Fig. 9, and so that the bar 16 may be moved vertically independent of the said levers 32; yet the said levers 32 must partake of the vibratory or swinging movement of the rods 19, which carry the bar 16. The levers 32 are each provided with a stud or stop 33, (see Figs. 8 and 9,) which work beneath corresponding stationary cams 34, so that the ascent of the follower is limited and the follower is held up by the springs 31 to bring the stops 33 against the stationary cams 34, as seen in Fig. 9. The stationary cams 34 present an inclined surface toward the stops 33, so that as the deliverer commences its forward movement from the position seen in Fig. 9 and advances the stops 33 will pass under the cams 34 and draw the follower down, so that the stops may pass below the stationary cams 34, as represented in broken lines, Fig. 6. Then as the deliverer rises, after having been advanced, as indicated in broken lines, Fig. 6, and commences its retreat the tobacco within the deliverer will come against the follower, and, the deliverer rising while the follower stands, the guard and the comb will be drawn up away from the tobacco, so as to leave it free upon the table. Then as the deliverer returns the stops 33 will escape from the cams 34, and the follower-springs will then return the follower into its up position.

The under surface of the follower 29 is liable to be gummed by its contact with the tobacco, and as it fits closely between the comb and guard, as the deliverer rises the gum which would adhere to the comb and guard will be scraped off by the follower. To remove this gum from the follower, a cleaner is provided, which consists of a transverse scraper 35, arranged to move up and down through the table in rear of the deliverer in its advance position, as seen in Fig. 6, it being shown up in broken lines. Normally this scraper stands down flush with the surface of the table, as seen in Fig. 6, so that the tobacco will pass freely over it as it advances; but as the deliverer retreats the scraper rises, as represented in broken lines, Fig. 6, and also seen in Fig. 7 in the up position, and so that the follower then projecting below the edge of the comb and guard will rub across the upper edge of the scraper 35, and so that the gum upon the follower will be scraped therefrom. Then after the follower has escaped from the scraper the scraper will drop to its down position. The scraper 35 is carried by two vertical rods 36 36, hung upon the shaft 20, as seen in Fig. 12, it being the same shaft that carries the deliverer, and so as to partake of the same up-and-down movement as the deliverer; but the scraper plays through a transverse slot in the table just forward of the endless band K, and as seen in Fig. 6, so that while the scraper partakes of the vertical movement of the follower it does not partake of its swinging movement. It therefore rises as the bar 16 rises, and normally stands in the up position, as seen in Fig. 7, but will be dropped as the deliverer drops from the position seen in Fig. 7 to that seen in Fig. 6. The tobacco thus delivered at the edge of the table is ready for the rolling and wrapping operation; but, as before described, the first portion delivered rests on the table until the deliverer advances with the next portion of tobacco. Then as the deliverer advances with the said next portion of tobacco it pushes the tobacco resting on the table off at the front edge into the rolling apparatus.

The deliverer which we have thus described is the same as that in the Patent No. 439,963, before referred to; but in the present case we employ the comb $u$ as an aid to sever the portion of tobacco from the mass, it co-acting with the deliverer for that purpose, the comb $u$ remaining stationary, while the comb 18 of the deliverer pulls the tobacco from the mass in contradistinction to making the comb $u$ a positive cutter which will cut through the tobacco and be the positive means for separating the requisite quantity of tobacco for a single cigarette.

The employment of the two combs thus described is a very great advantage over a positive cut, because it leaves both edges of the portion of tobacco in a more complete fibrous condition than when positively cut, and this fibrous condition yields the more readily to the subsequent operation of bringing that portion of the tobacco into a cylindrical shape.

37 represents the rolling-table. It is arranged in advance of the table 28, upon which the tobacco is delivered, and so as to leave an open space between the forward edge of the table 28 and the rear edge of the rolling-table 37, as seen in Fig. 16. The working-surface of the rolling-table is in the form of an arc of a circle, the center of which circle is a rock-shaft 38, arranged beneath the rolling-table, the axis of this rock-shaft and table being parallel with the delivering apparatus—that is, at right angles to the path of movement of the tobacco as it is fed into the machine. To the forward edge of the rolling-table a rolling-apron 39 is firmly secured, as at 40. The apron extends rearward over the table and has its rear edge attached to a swinging-rod 41, the length of the apron being so much greater than the length of the table 37 that the rear end of the apron may pass beneath the delivery-table 28, as seen in Fig. 16. The rod 41 is attached to the lower end of two arms 42, (see Figs. 2, 12, and 16,) which arms are hung upon axes 43 above. The hub of each arm 42 is provided with a pinion 44, into which a corresponding toothed segment 45 works. (See Fig. 6.) This segment is formed on one arm 46 of a bell-crank lever, the said lever being hung upon an axis 47, the other arm 48 of the said lever extending rearward, as seen in broken lines, Fig. 6, and so that the said segment may receive a vibratory movement. Preferably a like segment is provided for each arm 42, so as to insure a firm support to the swinging rod 41. The vibratory movement is imparted to the bell-crank lever 46 48 from a cam 49 on the driving-shaft and through a transverse rock-shaft 50, on which is an arm 51, against which the said cam 49 works to impart a rocking movement to said shaft 50. Near the opposite end of the said rock-shaft 50 arms 52 extend forward, and from these arms 52 rods 53 extend into connection with the arms 48 of the bell-crank lever 46 48. Thus arranged the cam 49 will impart a swinging movement to the segment 45 in one direction, the return movement being produced by means of a spring 54, (see Fig. 4,) and thus a back-and-forward swinging movement will be imparted to the segment 45, and the said segment, working in the pinion 44, will impart a corresponding back-and-forward movement to the apron-rod 41, as from the position in Fig. 16 to that seen in Fig. 18 and return. On the rock-shaft 38 two arms 55 are hung, projecting radially upward, and so as to work, respectively, each side of the rolling-table 16, as represented in Fig. 12, and also seen in Figs. 16 and 18. The upper ends of the arms 55 are connected by a round bar 56, forming a rolling-guard. Under the swinging movement of the arms 55 this guard 56 is adapted to pass over the table from its rear position, as seen in Fig. 16, to its extreme advanced position, as seen in Fig. 18. Normally, as seen in Fig. 16, the guard 56 stands below the apron 39, and so that as the guard rises it will strike the apron upon its then under side. On each arm 55 and near each upper end a projection 57 is made. These projections 57 carry a roller 58, supported in bearings in said arms, but so as to revolve upon its own axis, the roller passing over the table, but somewhat at the rear of and above the guard 56. The bearings of this roller should be connected to the arms 55, so that the position of the roller 58 may be adjusted with relation to the guard 56 and to the table, so as to contract and expand the space between the three, as occasion may require. As here represented, this adjustment is permitted by uniting the projections 57 to the arms 55 by means of longitudinal slots formed in the projections 57 and securing the projections to the said arms by screws through said slots, as represented by broken lines, Fig. 16. The vibratory movement is imparted to the arms 55 by a cam 59 on the driving-shaft B operating against the roller 60 on the end of a connecting-rod 61, which is jointed to a downwardly-projecting arm 62 on the rock-shaft 38. (See Fig. 16ª.) The return movement is made by a like cam 63 on the driving-shaft; but this cam is not shown, it simply producing a positive return movement of the rock-shaft 38. The tobacco for one cigarette having been left upon the table 28, as before described, the deliverer as it next advances will force that tobacco from the table, it falling off at the front onto the apron 39 forward of the bar 41 and between it and the edge of the rolling-table, the apron being somewhat depressed through that space to receive the tobacco. Now the bar 41 advances, doubling the apron, as seen in broken lines, Fig. 16. Then the rock-shaft 38 comes into operation and takes the guard 56 over that portion of the apron inclosing the tobacco, it passing forward of the tobacco and between the tobacco and the bar 41, as seen in Fig. 17. The bar 41, continuing its movement, draws the apron tight around the tobacco which then lies in the pocket 64, formed by the apron so doubled. The roller 58 is adjusted so that it will bear upon the outside of this pocket inclosing the tobacco, as seen in Fig. 17, and the adjustment of this roller 58 with relation to the rolling-table 37 and the guard 56 is such as to surround a space corresponding to the circumference of the apron around the tobacco. The bar 41 continues its advance movement, as do also the guard 56 and the roller 58, the apron being drawn up from the table, the guard in advance of the pocket, and the roller operating directly upon the outer surface of the pocket as it passes over the table, and so that the drawing or rolling movement of the apron will produce a corresponding rolling movement of the tobacco to bring it into the requisite cylindrical shape, the roller 58 serving to compress that tobacco into the cylinder of the required diameter. The diameter of the cylinder of tobacco may be changed by adjusting the roll 58 accordingly. This operation continues until the extreme position is reached, as seen in Fig. 18, where the apron is drawn taut and the guard 56 has passed beyond the forward end of the table, and so that the tobacco represented in said Fig. 18 at 65 may be delivered from the apron at that point. Then the parts return to their first position, as seen in Fig. 16, to receive a second portion of tobacco for the next cigarette, and so on.

Upon each side of the rolling-table and at the rear a thin plate $z$ is applied, (see Figs. 3 and 16,) which stands vertical and projects rearward at each side of the apron, and between which the bight of the apron is formed. These plates, however, are not essential to the operation of the machine.

The operation of rolling, so far as the apron and the guard are concerned, is substantially the same as that in the Patent No. 400,780, before referred to. The introduction of the roller 58, as we have described, serves to compact the tobacco into the most perfectly cylindrical and uniform shape. To impart a positive revolution to the roller 58, a cord 66 is attached by one end to a stud 67, here represented as on the arm 4, by which the comb is raised (see Fig. 6) in rear of the roller, this cord passing forward and upward, and then around the roller 58, as seen in Fig. 19, thence extending forward. The other end of the cord is attached to a spring 68. (See Fig. 18.) This cord, because of its being wound around the roller 58 and the cord itself being substantially stationary, forces the roller to revolve as it advances, the spring 68 yielding readily to any extension of the cord required by the segmental path through which the said roller passes. The direction of this forced revolution of the roller 58 corresponds to the bight of the apron, and so that it operates as a pressure-roller upon the apron to compress the tobacco, as before described. During the operation of rolling the tobacco and before the roll of tobacco has reached the front side of the rolling-table the wrapper in which the tobacco is to be rolled is laid upon the apron in front of it, as represented in broken lines, Fig. 17, 69 representing the wrapper, and 70 indicating the roll of tobacco at the time the wrapper is presented. The wrapper is thus presented upon the surface of the apron lying upon the table, and so that as the rolling operation is continued the inner edge of the wrapper will be taken between the roll of tobacco and the apron, and so that the paper will be wound around the tobacco as the rolling of the tobacco continues toward the front edge of the table, and the outer edge of the paper, having been previously coated with paste or adhesive material, will adhere to the surface of the preceding convolution of the paper, and so as to secure the paper around the tobacco. The paper may be thus presented by hand; but we prefer to employ the automatic mechanism for presenting the paper at the proper time, which is illustrated in the Patent No. 400,780, before referred to, and this apparatus we illustrate and will describe somewhat briefly, for the reason that improvements have been made in that apparatus.

A spool 71 is hung upon an axis 72, adapted to receive the strip of paper from which the wrappers are to be cut. This strip in width corresponds to the width required for the wrappers, and the wrappers are cut from this strip in lengths required for wrapping the cigarette. The spool 71 stands substantially free upon its axis, so that the paper may be readily drawn therefrom, and the axis of the spool is parallel with the path of the rolling devices—that is to say, the spool stands in a plane at substantially right angles to the direction of the movement of rolling devices. From the spool the strip 73 of paper is led around a friction-bar 74, and thence around a roller 75, arranged upon a swinging arm 76, and thence around a roller 77, arranged upon the axis of motion of the said swinging arm 76. To this arm 76 a swinging or vibratory movement is imparted from a crank-wheel 78, connected by a rod 79 with an arm 80, projecting from the hub of the swinging arm 76. The crank-wheel 78 being a gear-wheel derives its rotation from a counter-shaft 81, which by a train of gearing and counter-shafts receives its rotation from the driving-shaft B, as seen in Fig. 15, each revolution of the crank-gear 78 imparting a swinging movement to the arm 76, as from the position in Fig. 20 to that seen in broken lines in the same figure, and so that the paper in advance of the roll 77 being held the downward movement of the roll 75 to the position seen in broken lines, Fig. 20, will draw the paper from the spool corresponding to this swinging movement. The purpose of this drawing of the paper from the spool will be hereinafter explained. The strip of paper 73 passes from the roller 77 through a guide 82 and over a die-block 83, (see Fig. 20,) above which die-block is a presser 84, carried by a vertical slide 85, to which an up-and-down reciprocating movement is imparted, and so that when in the down position it will clamp the paper upon the die-block 83. This reciprocating movement is imparted to the slide 85 through a vibrating arm 86 on a shaft 87, (see Figs. 1, 4, and 20,) and so that at the proper time a swinging movement imparted to the arm 86 will impart corresponding rocking movement to the shaft 87 and the up-and-down movement to the slide 85, so as to bring the presser upon the paper to clamp it in position at the proper time, and then retreat. The swinging movement is imparted to the arm 86 by means of a cam 88 on the shaft Y, operating through a bell-crank lever 89, connected to the arm 86 by a rod 90, the cam operating in one direction and a spring 91 returning the same. When it is desired to print or emboss the paper, as with the name of the manufacturer, the name of the cigarette, or other mark, the faces of the presser and the die-block are constructed accordingly. The paper continues beyond the clamping apparatus and passes through a guide 92, and then between or over parallel guides 93 93, as seen in Figs. 1 and 22, and between which guides 93 is a finger 94, these guides 93 and finger 94 forming a table over which the strip of paper will pass, the spaces 95 between the finger and guides producing open longitudinal slots extending to the extreme outer end of the table—that is, are open through that end of the table—and as clearly seen in Fig. 1. Immediately forward of this slotted paper-table a pair of cutters 96 and 97 is hung upon a pivot 98, (see Figs. 20 and 22,) and so as to swing in a vertical plane to the line of the strip of paper. The one blade 96 stands above the strip of paper and the other blade 97 stands below the paper, as indicated in Fig. 22. The blades are normally held open by a projection 99 from a lever 100, extending upward from a rock-shaft 101. The projection 99 works between the arms of the blades, the corresponding edges of the said arms being constructed each with a cam-like surface 102, so that as the projection 99 is forced toward the pivot of the blades the blades are separated, as seen in Fig. 22; but when the projection is forced toward the cutting portion of the blades and from between the cams 102 then the blades are closed by the action of a spring 103 provided for the purpose, and as represented in broken lines, Fig. 22. Therefore, if the strip of paper be drawn outward between the blades when open, the closing of the blades, as described, will cut the projecting portion of the paper from the strip. The rocking movement is imparted to the shaft 101 by means of a cam 104 on the shaft Y operating a bell-crank lever 105, from which a connecting-rod 106 extends to an arm 107, projecting from the rock-shaft 101, as seen in Figs. 4 and 22, the cam operating to force the projection 99 between the cam portions of the cutters, and the spring of the cutters serves to throw the projection 99 forward when free so to do. An additional spring 108 (see Fig. 4) is provided to aid this spring action of the jaws in the forward movement of the projection 99. By this arrangement the operation of the cutters is instantaneous. The mechanism thus described for conducting, holding, and cutting the paper is arranged above the rolling-table and at one side thereof, as seen in Figs. 2 and 3. To take the wrapper thus cut from the strip and present it to its proper place on the bed a pair of fingers 109 and 110 are provided, which are in length substantially the length of a wrapper and in width somewhat less than the width of the strip of paper. The one finger 109 is made fast to the arm 111, which is fixed to a rock-shaft 112, this shaft being parallel with the rolling devices and also parallel with the direction in which the paper is guided. The said shaft 112 is also free for a certain amount of longitudinal movement, as will presently appear. The finger 110 is arranged to slide upon the arm 111 toward and from the finger 109, as from the position seen in Fig. 20 to that seen in Fig. 21 and return—that is to say, the finger 110 projects from a slide 113, which is guided upon the arm 111, and so that while having the opening and closing movement of its own it must also partake of both the rotative and longitudinal movement of the shaft 112, which carries the arm 111. The shaft 112 is arranged in bearings on a line midway between the rolling-bed and the strip of paper, as represented in Fig. 17. The fingers normally stand over the rolling-table, as represented in Fig. 2, and also in the position seen in Fig. 21, broken lines, Fig. 21 representing the fingers as open. The longitudinal movement of the shaft 112 is sufficient to take the fingers 109 110 from their position in Fig. 21 to that seen in Fig. 20, it being understood that the fingers are in the open position represented in broken lines, Fig. 21, and also as in Fig. 20. During this movement and under this movement the fingers pass between the cutting-blades 96 97 onto the paper resting upon the paper-table. The longitudinal movement of the shaft 112 is produced from cams 114 and 115 on the shaft Y, (see Figs. 4 and 23,) these cams operating through a rod 116, connected to one arm 117 of a bell-crank lever, the other arm 118 of the said bell-crank lever carrying a toothed segment 119, working into a toothed rack 120 on a slide 121, the said slide being supported by and so as to reciprocate upon a stationary shaft 122 (see Figs. 20 and 23) and as from the position seen in Fig. 23 to that seen in broken lines, same figure. The slide 121 is connected with the shaft 112 by a projection 123 from the slide 121, which stands between two collars 124 and 125 on the shaft 112, as clearly seen in Fig. 20, and so that as the segment 119 is turned in either direction it will impart a corresponding longitudinal movement to the said shaft 112. The shaft 112 receives its oscillatory movement from a bell-crank lever, (see Fig. 4,) one arm 126 of which carries a toothed segment 128, which works into a pinion 129 on the shaft 112, the pinion being a part of the sleeve supported on the bearing through which the shaft extends, so as to permit the free revolution of the pinion without longitudinal movement of that pinion; but the shaft passes through the sleeve, so that it may receive a longitudinal reciprocating movement, yet engage the pinion, so as to revolve with the pinion, as will be presently described. The said bell-crank-lever receives its vibratory movement from a cam 130, operating through a two-armed lever 131, connected by a rod 132 to the other arm 127 of the said bell-crank lever, as also seen in Fig. 4.

The position of the fingers 109 110 is represented in Fig. 20 as upon the paper, the fingers being shown as open preparatory to grasping the paper. When this position is reached, the finger 110 is forced upward against the under side of the paper, so as to firmly grasp the portion of the strip between the two fingers. This closing movement of the finger is produced by means of a sliding cam 133, which is constructed with a vertical oblique slot 134. The said cam is carried by a slide 135, arranged in a longitudinal slot in the shaft 112. The cam 133 works through a radial slot in the lower end of the slide 113 of the finger 110. Across the slot in the slide is a pin or roller 136, which passes through the slot 134 in the cam. As the slide 135 is forced through the slide 113, the inclined slot 134 causes the slide 113 and the finger 110 to move radially from the shaft 112, so that the finger 110 is carried toward the finger 109 until it firmly closes upon the paper, and the paper is grasped between the fingers 109 110, as represented in broken lines, Fig. 20.

The slide 135 through the sleeve and pinion 129 is of a width greater than the diameter of the shaft 112, as seen in Figs. 20 and 20ª. The sleeve and pinion are correspondingly grooved, so that the edges of the slide 135 extend into the sleeve and serve as splines to engage the shaft 112 through the pinion 129, in order that the shaft may partake of the rotative movement of the pinion 129, yet be free for longitudinal movement within the pinion and sleeve. Longitudinal movement is imparted to the slide 135 independent of the shaft 112 by means of a sliding shaft 137, supported in bearings 138 139. (See Figs. 2 and 4, also Figs. 20 and 23.) This shaft is parallel with the shaft 112, and backward-and-forward sliding movement is imparted to the shaft 137 from cams 140 and 141 (see Fig. 4) through a bell-crank lever 142 143, (see Fig. 23,) a connecting-rod 144 connecting the said cams with the one arm 142 of the said lever, the other arm 143 engaging the shaft 137 through a block 145, made fast to said shaft 137. The shaft 137 carries an arm 146, which extends up over the shaft 112, as seen in Figs. 23 and 24, and which, as the shaft 137 is thrown forward, will strike the projecting end of the slide 135, as seen in Figs. 20 and 22, and impart to said slide the outward movement indicated in broken lines, Fig. 20, to give the closing movement to the finger 110, as before described, and so that the paper is firmly grasped between said fingers. Then the longitudinal movement of the shaft 112 takes place, forcing the fingers 109 110 longitudinally through and beyond the cutters 96 97, as seen in Fig. 21, and the fingers draw the paper through between the cutters to the length required for a single wrapper, thus producing the feed of the requisite quantity of paper. Thereupon the cutters are brought together, as before described, and as seen in broken lines, Fig. 21, to sever the portion of paper from the strip, the fingers resting for an instant while the blades thus come together. The fingers having thus grasped the wrapper then advance to their extreme inward position. (Represented in Fig. 20.) The edge of the wrapper projects both sides of the fingers, as represented in Figs. 17 and 16, 69 representing the wrapper.

The device for applying the adhesive material is arranged directly back of the fingers when they hold the detached wrapper.

The adhesive or pasting device consists of a hopper 148, arranged over a pair of rollers 149 and 150, the axes of these rollers being parallel with the fingers which carry the paper. The roller 150 stands in a position in such relation to the fingers when the wrapper has been brought to the position just indicated that the edge of paper on that side of the fingers may come in contact with the surface of the roller 150, as seen in Fig. 17. The pasting-rollers revolve in the direction indicated by the arrow, Fig. 16, by any suitable mechanism applied thereto, here represented as from a cam 151, (see Figs. 2 and 3,) operating a pawl 152, working into a ratchet 153 on a shaft 154, carrying a pinion 155, which works into a pinion 156 on the end of the paste-roller 150, the paste-rolls, preferably, being geared together. After the wrapper has been brought to the position in front of the roller 150, as seen in Fig. 16, a slight rearward rotative movement of the shaft 112 from the position seen in Fig. 16 to that seen in Fig. 17 will bring the edge of the wrapper upon the paste-roller 150 and so that the revolving paste-roller will apply the requisite quantity of paste or adhesive material to the edge upon the then under side of the wrapper.

To inclose the paste-rollers, excepting at the time when the application of the paste to the wrapper is required, a cover 157 is arranged beneath the rollers and hung upon a hinge 158, (see Fig. 16,) the cover extending up between the roller 150 and the wrapper-fingers, as seen in Fig. 16, which incloses the said roller 150. A spring 159 is provided, the tendency of which is to hold the cover in this up position. The cover at the hinge is provided with a downwardly-projecting arm 160, against which a sliding rod 161 bears, and the said rod extending forward is supported in a guide 162 and in the plane of the cutter-operating lever 100, as seen in Fig. 16, and so that as the said lever 100 is moved forward to permit the closing of the cutters the lever will impart a rear movement to the rod 161 and impart a downward opening movement to the cover 157, as indicated in broken lines, Fig. 16, the cover opening to a position below the wrapper held by the fingers, as seen in Fig. 17. Then upon the return movement of the lever 100 to open the cutters the cover will be free to return and inclose the paste-roller; but this closing movement does not occur until after the wrapper has moved away from the paste-roller. By this arrangement of the cover the paste-roller is always protected, except during the instant of the pasting-operation.

To bring the wrapper to its place on the rolling-table, a rotative movement, before described, is imparted to the shaft 112, which will turn the arm 111 with the fingers and wrapper down to the rolling-table, as represented in broken lines, Fig. 17. This movement of the fingers and wrapper brings what was before the outer edge of the wrapper directly upon the apron and just in advance of the tobacco being rolled.

After the wrapper 69 has been caught by the rolling devices, as seen in Fig. 17, the fingers holding the paper are opened by the return movement of the slide 135. In this return movement an arm 163, which extends from the shaft 137 below the shaft 112, will strike a corresponding shoulder 164 on the slide 135, it being understood that the slide 135 continues along through the shaft, but of a width no greater than the shaft, as seen in Fig. 24, and so that the said shoulder 164 will, when the fingers are in the out or delivering position, stand substantially close up to the said arm 163. The arm 163, striking the said shoulder, imparts the return or opening movement to the slide 135. Thereupon the shaft 112 is given a return rotation to bring it to the up position, and substantially as seen in Fig. 21, preparatory to the advance movement to produce the feed of the paper and take the wrapper.

The wrapper which was left upon the apron has its upper outer edge pasted, as before described, and so that as the rolling operation before described is completed the paper is wrapped around the tobacco, the pasted edge adhering to the corresponding surface of the wrapper. This automatic feed and delivery of the paper by a single instrumentality is the same as that in the Patent No. No. 400,780, before referred to, and the same may be said of the pasting apparatus, except as to the cover for the paste-roller.

As the cigarette is completed it passes off the rolling-table free from the apron, as seen in Fig. 18. 65 of this figure, being referred to as the rolled tobacco, now represents the completed cigarette as just delivered from the rolling apparatus and having fallen into receiving-fingers 165, arranged to receive it. There are two pairs of these fingers, so that a pair stands near each end of the full length of the cigarette. The fingers are hung upon an axis 166, parallel with the guard 56, and so that after the cigarette has been delivered to the fingers the fingers receive a downward swinging movement, as hereinafter described, causing the fingers to descend, as indicated in broken lines, Fig. 18, until the cigarette may escape therefrom. The object of these fingers is to hold the cigarette in substantially the same longitudinal position in which it comes from the apron, in order that the ends of the cigarette may be trimmed. The trimming of the ends of the cigarette is produced by two swinging cutters 167. (See Fig. 18ª.) These cutters are hung upon a shaft 168, and so as to swing in a vertical plane at right angles to the axis of the cigarette to be trimmed. Immediately below the swinging cutters corresponding stationary cutters 169 are arranged, so that the cutters 167, vibrating, act in conjunction with the cutters 169 as shears to clip the respective ends of the cigarette. The required rocking movement is imparted to the shaft 168 through a rod 170, hinged by one end to an arm 171, extending from the rock-shaft 168, the rod extending rearward. Its other end is hinged to the shaft 27, (see Figs. 6 and 12,) the said shaft 27 forming part of the connection by which the swinging movement is imparted to the deliverer, as before described. The fingers 165 carry the cigarette down, as before described, between the blades, and to insure the discharge of the cigarette from the fingers onto the stationary cutter 169, a clearer 172 is arranged. This is an inverted hook. (See Figs. 18 and 18$^b$.) It is formed as a part of a spring 173 between the cutters and below the swinging cutter 167, that cutter being provided with a stud 174, which, as the cutter descends, will strike the spring 173 and depress it, as seen in broken lines, Fig. 18$^b$, the hook 172 catching the cigarette held by the fingers 165 and forcing it therefrom onto the cutters 169, as indicated in broken lines, said Fig. 18$^b$. Now the cutters 167 descend and trim the ends of the cigarette, so that thus trimmed it falls complete from the machine. The swinging movement is imparted to the fingers 165 through a cam 175 on the cutter-shaft 168, and which, as the cutter commences its descent, engages a stud 176 on a gear-wheel 177, which works into a corresponding gear 178 on the finger-shaft 166, so that as the cutter descends it turns the wheel 177, thereby correspondingly turning the fingers to deliver the cigarette to the cutters, as before described.

To deliver the cigarettes from the machine in a condition for being conveniently introduced into boxes for market, and to avoid any considerable handling when they drop from the machine, as before described, they successively fall upon an endless band 179, which passes around a drum 180 at the right-hand end and around a corresponding drum 181 at the left-hand end. As here represented, this band is of a chain character and the drums of corresponding sprocket-wheel construction. A constant travel is given to the said endless band by a train of gearing represented in Fig. 15, operating the shaft 81. The cigarettes successively fall upon the said chain, it advancing, so as to remove one cigarette, its length at least before the next cigarette drops upon the band. Thus the cigarettes will be advanced in a continuous longitudinal line. At the end of the endless band a series of carrying-rollers 182 (see Fig. 15) are arranged, the axes of which are parallel with the axes of the drums of the said band, and these are arranged substantially in line with the upper run of the band, so that cigarettes may pass from the band directly onto these rollers. Rotary movement is imparted to the said carrying-rollers from a gear 183 on the end of the shaft 81, operating a train of gearing, (see Fig. 2,) so as to impart to the said carrying-rollers an advance rotative movement beyond the end of the band.

To take the cigarette from the rollers 182 and transfer it to a receiver, a carrying device is arranged upon the right-hand side of the machine, which is adapted to take the cigarettes from the rollers 182 as soon as they shall arrive thereon and carry them to a receiver 184. (See Figs. 4 and 25.) This carrying device consists of two stationary parallel bars 185, arranged at right angles to the axis of the rollers 182 and inclined upwardly therefrom, as seen in Figs. 15 and 25, and also shown in transverse section, Fig. 26. These bars are constructed with a series of rests 186 distant from each other somewhat greater than the diameter of a cigarette. Parallel with and at the side of these bars 185 are other parallel bars 187, which are arranged to receive an upward and forward and then downward and retreating movement. These bars are supported upon a frame 188, carried by a pair of cranks 189 190. (See Fig. 25.) These bars are inclined the same as the bars 185 and are arranged to move together. Their lower end terminates in a hook 191, which hooks in the down or normal position of the bars 187 extend between the rollers 182, as seen in Figs. 15 and 25, and so as to stand below the cigarette, 192 representing a cigarette resting upon the rollers 182. The bars 187 are constructed with stops 193, spaced corresponding to the stops 186 of the bars 185. These stops on the several bars are here represented as pins. In operation, the cranks revolving, the bars 187 rise to the position seen in broken lines, Fig. 25, the hooks taking the cigarette 192 from the rollers, raising it to a point above the stops 186 of the bars 185, and then the bars 187 advance under the rotative movement of the cranks, carrying the cigarette beyond the first stop on the stationary bars 185. Then the bars 187 drop, bringing that cigarette 192 into a position forward of the first stop of the bar 185, and there leave it, 194 representing that cigarette so advanced, where it will rest while the bars 187 return to bring their hooks 191 below the next cigarette when, again rising, as before, the cigarette 194 will be raised from the bars 185, and with the second cigarette advanced, bringing the first cigarette forward of the next stop on the bars 185, as at 195, while the second cigarette will take its place forward of the first stop—that is, 194—and so continuing the cigarettes will be successively taken from the rollers 182 and advanced step by step along the stationary bars 185. The rotation of the cranks 189 and 190 is produced by a train of gearing, (represented in Fig. 4, and also seen in Fig. 15,) 196 and 197 representing the two crank-shafts. At the upper end of the stationary bars 185 a chute 214 is provided, inclining downward, and so that the first cigarette arriving at that end will roll off this chute onto a lifter 198. (See Fig. 25, and also seen in Fig. 4.) This lifter is arranged upon a vertical slide 199, and to which slide a vertical reciprocating movement is imparted by a crank-wheel 200 on the driving-shaft B, the crank-pin 201 of which works in a slot 202 of one arm 203 of a bell-crank lever hung upon an axis 204, the other arm 205 of the said bell-crank lever being connected to said vertical slide by a link 206, and so that in the rotation of the said crank-wheel 200 an up-and-down reciprocating movement will be imparted to said slide 199 and the lifter 198, as indicated in broken lines, Fig. 25. Through the bottom of the receiver 184 is an opening 207, which is closed by a swinging arm 208, the said arm swinging backward and forward, as indicated in broken lines, Fig. 25. In rising, the lifter forces the cigarette upward, which causes the arm 208 to fall back to permit the cigarette to rise with the lifter into the receiver and above the upper end of the arm 208. Then the arm 208 will be forced forward by a spring 209 provided for the purpose beneath the cigarette so elevated, 210 representing the cigarette so raised. This closes the opening against the descent of the cigarette. Then the lifter returns for the next cigarette and so continues its operation, the cigarettes being successively carried up into the receiver and there delivered, the cigarettes piling, but always parallel and in a condition to be removed from the receiver by any suitable device which will not disturb the parallelism of the cigarettes. The cigarettes thus delivered into the receiver complete the operation of the machine, and the cigarettes themselves are ready for market or use.

The devices for trimming the cigarettes and the endless band for delivering the cigarettes are substantially the same as those of the Patent No. 400,780, before referred to.

Like the previous machines, the endless band for receiving the cigarettes and the mechanism for carrying the cigarettes to the receiver may be omitted, or other apparatus may be substituted for delivering to the receiver—such, for illustration, as that described in the Ludington patent, No. 400,780, before referred to.

What we have described as rollers 182, it will be evident, may be stationary pins, or any suitable device upon which the cigarette may be presented, so that the hooked ends of the bars 187 may work up through it and so as to take the cigarette, as described.

As dust from the tobacco is liable to lodge upon the apron in advance of the rolling operation, it should be removed, and as a convenience for so doing we arrange an air-pump 211, (see Fig. 2,) which discharges air through a tube 212, directed through a nozzle 213 onto the table.

We claim—

1. In a machine for making cigarettes, a tobacco-feed consisting of a channel and a traveling endless apron, one run of which forms the bottom of the said channel and is adapted to advance the tobacco, combined with a vertically-reciprocating and longitudinally-swinging presser-foot 7 above said apron, and between which and said apron the tobacco passes, substantially as described.

2. In a machine for making cigarettes, having a channel with an endless traveling apron, one run of which forms the bottom of the said channel, and mechanism in connection with said apron to advance the tobacco through the channel, the combination therewith of a distributer composed of a vertically-reciprocating plate carrying numerous downwardly-projecting pins over said apron, the said pins under the reciprocation adapted to pass down into and be withdrawn from the tobacco, substantially as and for the purpose described.

3. In a machine for making cigarettes, the combination of a channel, a traveling endless apron, one run of which forms the bottom of the said channel and upon which the tobacco to be fed is placed, a longitudinal reciprocating carriage arranged over said channel and apron, a vertical reciprocating plate on said carriage, but between it and the said apron, the said plate provided with numerous pins adapted to enter the mass of tobacco on the apron, and a plate below said pin-carrying plate stationary as to its vertical position, perforated corresponding to said pins, and through which the said pins will work up and down, substantially as described.

4. In a machine for making cigarettes in which the tobacco is fed in mass upon a traveling endless apron, the combination therewith of a vertically-reciprocating toothed comb $u$, arranged transversely across and above said apron, with a deliverer carrying a like comb 18, the said deliverer and its comb having an up-and-down advancing and retreating movement imparted to it, and whereby said comb 18 will pass into the mass of tobacco forward of the comb $u$ and in its advance movement remove the tobacco so standing forward of the said comb $u$, substantially as described.

5. In a machine for making cigarettes in which the rolling of the tobacco is produced by an apron, one end of which is made fast to the forward edge of the table and the other end carried by a rod adapted to swing upward and forward and return, the combination therewith of the swinging guard 56 and the roller 58, carried with said swinging guard, substantially as and for the purpose described.

6. In a machine for making cigarettes and in which the strip of paper is drawn from a spool and delivered to a feeding device adapted to take the requisite quantity of paper from the strip, the combination therewith of a clamp through which the said strip passes, the said clamp adapted to intermittently grasp and hold the said paper or permit it to be fed, a stationary bar 74, over which the said strip passes, and a second stationary bar 77, around which said strip passes, with a swinging arm 76, carrying a roller 75, bearing upon the paper between the said bars 74 and 77, substantially as described, and whereby, under the swinging movement of said roller 75, paper will be drawn from said spool independent of the feeding device.

7. In a machine for making cigarettes in which an apron is attached to the forward edge of the rolling-table, the other end of the apron being carried by an upwardly and forwardly swinging bar at the rear of the table, the said apron adapted to receive the tobacco for the cigarette at the rear of the table, the combination therewith of the guard 56, the roller 58, and a wrapper-deliverer arranged to present the wrapper to the apron on the rolling-table and immediately in advance of said guard 56, substantially as described, and whereby the said guard with the apron serves to grasp the edge of the wrapper so presented that the continued movement of the apron may roll the wrapper around the tobacco.

8. In a machine for making cigarettes in which the rolled cigarettes are delivered from the rolling-table, the combination therewith of a pair of swinging fingers 165, stationary cutters 169, corresponding swinging cutters 167, and the clearer 172, adapted to force the cigarettes from the fingers onto the said cutters 169, substantially as described.

9. In a machine for making cigarettes in which the completed cigarettes are successively delivered upon a carrier moving in the direction of the length of the cigarette, the combination therewith of a pair of stationary parallel bars 185, the said bars arranged at right angles to said carrying devices and provided with a series of rests, and a second pair of bars 187 parallel with said stationary bars 185, said bars 187 carrying a series of rests corresponding to the rests of the bars 185, and the said bars 187 adapted to receive an upward and advancing and then downward and retreating movement, the ends of said bars 187 in their rising movement adapted to take a cigarette presented at one end and then advance it one step, leave it upon the rests of the bars 185, then returning beneath the next cigarette, substantially as described, and whereby the said cigarettes will be transferred step by step to the point of delivery.

10. In a machine for making cigarettes having a device for successively delivering the cigarettes complete, a receiver 184, having an opening through its bottom, a reciprocating lifter 198 below said opening and onto which the cigarettes may be successively delivered, with an arm 208 arranged to swing across the opening in the bottom of the said receiver and over the said lifter, but to yield under the rising movement of the lifter, with mechanism, substantially such as described, to impart said swinging movement to said arm, substantially as described, and whereby the cigarettes so delivered will be successively lifted into the said receiver.

11. In a machine for making cigarettes in which wrapper-transferring devices are employed to take the wrapper to the rolling apparatus, the combination therewith of a paste-hopper 148 and a paste-roller 150 below said hopper, combined with a cover 157 below and so as to inclose said paste-roller, and mechanism, substantially such as described, to automatically open said cover to expose the paste-roller, and also to close said cover, substantially as and for the purpose described.

FRANK J. LUDINGTON.
EDWARD T. POLLARD.

Witnesses to Ludington:
JOHN E. EARLE,
FRED. C. EARLE.
Witnesses to Pollard:
SPOTT. J. ALLEN,
J. D. LOCKE.